US011755999B2

(12) United States Patent
Kulkarni et al.

(10) Patent No.: US 11,755,999 B2
(45) Date of Patent: Sep. 12, 2023

(54) ARTIFICIAL INTELLIGENCE BASED PROJECT IMPLEMENTATION

(71) Applicant: ACCENTURE GLOBAL SOLUTIONS LIMITED, Dublin (IE)

(72) Inventors: Aditi Kulkarni, Bangalore (IN); Koushik M. Vijayaraghavan, Chennai (IN); Minal Baronia Gupta, Bangalore (IN); Ranjith Tharayil, Bangalore (IN); Sakshi A. Kapoor, Bangalore (IN); Jeffson Felix Dsouza, Pune (IN); Raghavendra Meharwade, Bangalore (IN); Ashwini C. Surve, Mumbai (IN); Anubhav F. Gupta, Meerut (IN); Rajesh Nagarajan, Chennai (IN); Khaja Kamal Avaruman Mohammed, Bangalore (IN); Nevis Ravikumar Rodriguez, Tuticorin (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 434 days.

(21) Appl. No.: 17/079,089

(22) Filed: Oct. 23, 2020

(65) Prior Publication Data

US 2021/0125148 A1 Apr. 29, 2021

(30) Foreign Application Priority Data

Oct. 24, 2019 (IN) .............................. 201911043328

(51) Int. Cl.
*G06Q 10/10* (2023.01)
*G06Q 10/06* (2023.01)
*G06Q 10/0631* (2023.01)

(52) U.S. Cl.
CPC ... *G06Q 10/103* (2013.01); *G06Q 10/063114* (2013.01)

(58) Field of Classification Search
CPC ......... G06Q 10/103; G06Q 10/063114; G06N 3/006; G06N 20/00
See application file for complete search history.

(56) References Cited

U.S. PATENT DOCUMENTS

| 2006/0080196 A1* | 4/2006 | Griffin | ................... G06Q 40/00 705/35 |
| 2008/0229276 A1* | 9/2008 | Koehler | .................... G06F 8/35 717/104 |

(Continued)

FOREIGN PATENT DOCUMENTS

| CN | 107111349 A | * | 8/2017 | ........... G06F 1/3243 |
| WO | WO-0167354 A1 | * | 9/2001 | ............. G06Q 10/06 |

(Continued)

OTHER PUBLICATIONS

Alexandra Mihalache, "Project Management Tools for Agile Teams", 2017, Informatica Economica, vol. 21, No. 4, pp. 85-93. (Year: 2017).*

(Continued)

*Primary Examiner* — Tan D Nguyen
(74) *Attorney, Agent, or Firm* — MANNAVA & KANG, P.C.

(57) ABSTRACT

In some examples, artificial intelligence based project implementation may include implementing, for a project team, self-evaluation of viability for utilizing a project implementation framework. The project team may be guided on utilization of the project implementation framework. A discussion by the project team may be documented in a digital format during envisioning associated with the project implementation framework, and documented information may be maintained for reference during execution, by the project team, of a journey associated with the project implementation framework. During execution of the journey, implementation of a social contract by the project team may (Continued)

be evaluated. A determination may be made as to whether the social contract is not implemented for at least one specified occurrence associated with the project implementation framework, and at least one impediment associated with the project implementation framework may be identified. The identified impediment associated with the project implementation framework may be remediated.

19 Claims, 19 Drawing Sheets

(56) References Cited

U.S. PATENT DOCUMENTS

| | | | |
|---|---|---|---|
| 2010/0332529 A1* | 12/2010 | Nayak | G06F 9/54 707/812 |
| 2013/0073994 A1* | 3/2013 | Liao | G06F 9/44 715/762 |
| 2014/0032362 A1* | 1/2014 | Frayman | G06Q 30/0633 705/26.8 |
| 2014/0052643 A1* | 2/2014 | Baldwin | G06Q 10/06 705/301 |
| 2018/0365628 A1* | 12/2018 | Bhaskaran | G06Q 10/063112 |
| 2019/0122153 A1 | 4/2019 | Meharwade et al. | |
| 2019/0187682 A1 | 6/2019 | Cellar et al. | |
| 2019/0303140 A1* | 10/2019 | Kelly | G06N 3/08 |

FOREIGN PATENT DOCUMENTS

| | | | | |
|---|---|---|---|---|
| WO | WO-2011086466 A1 * | 7/2011 | | A61B 5/0002 |
| WO | WO-2017151012 A1 * | 9/2017 | | C12N 1/20 |
| WO | WO-2018100874 A1 * | 6/2018 | | A01K 11/006 |

OTHER PUBLICATIONS

Tony Grundy, "Strategy Implementation and Project Management," 1998, International Journal of Project Management, pp. 43-50 (Year: 1998).*

Farzana Mir, "Exploring the value of Project Management . . . and Project Success," 2014, International Journal of Project Management, 32 (2014), pp. 202-217. (Year: 2014).*

Hans-Erik Eriksson, "Business Modeling with UML," 2010, Open Training. (Year: 2010).*

Collabnet Versionone, "#StateOfAgile", 12th annual State of Agile Report, Apr. 10, 2018, 16 pages. <https://www.qagile.pl/wp-content/uploads/2018/04/versionone-12th-annual-state-of-agile-report.pdf>.

Daniela Field, "5 Reasons Why Agile Fails and How to Fix It", Apr. 23, 2018, 5 pages. <https://www.mendix.com/blog/5-reasons-why-agile-fails-and-how-to-fix-it/>.

HERES, "HERES Chatbots Between NLP and Wizard, Two conversation approaches in comparison", Jun. 15, 2018, 6 pages. <https://heres.ai/blog-en/chatbot-heres-between-nlp-and-wizard>.

* cited by examiner

1600

```
┌─────────────────────────────────────────────────────────────┐
│  IMPLEMENT, FOR A PROJECT TEAM, SELF-EVALUATION OF VIABILITY │
│     FOR UTILIZING A PROJECT IMPLEMENTATION FRAMEWORK         │
│                          1602                                │
└─────────────────────────────────────────────────────────────┘
                              │
                              ▼
┌─────────────────────────────────────────────────────────────┐
│ EVALUATING, BASED ON THE VIABILITY FOR UTILIZING THE PROJECT │
│   IMPLEMENTATION FRAMEWORK AND DURING EXECUTION OF A         │
│   JOURNEY ASSOCIATED WITH THE PROJECT IMPLEMENTATION         │
│   FRAMEWORK, IMPLEMENTATION OF A SOCIAL CONTRACT BY THE      │
│                     PROJECT TEAM                             │
│                          1604                                │
└─────────────────────────────────────────────────────────────┘
                              │
                              ▼
┌─────────────────────────────────────────────────────────────┐
│  DETERMINE, BASED ON THE IMPLEMENTATION OF THE SOCIAL        │
│  CONTRACT BY THE PROJECT TEAM, WHETHER THE SOCIAL            │
│  CONTRACT IS NOT IMPLEMENTED FOR AT LEAST ONE SPECIFIED      │
│  OCCURRENCE OF A SOCIAL CONTRACT REQUIREMENT ASSOCIATED      │
│       WITH THE PROJECT IMPLEMENTATION FRAMEWORK              │
│                          1606                                │
└─────────────────────────────────────────────────────────────┘
                              │
                              ▼
┌─────────────────────────────────────────────────────────────┐
│ IDENTIFY, BASED ON A DETERMINATION THAT THE SOCIAL CONTRACT  │
│    IS NOT IMPLEMENTED FOR THE AT LEAST ONE SPECIFIED         │
│  OCCURRENCE OF THE SOCIAL CONTRACT REQUIREMENT ASSOCIATED    │
│  WITH THE PROJECT IMPLEMENTATION FRAMEWORK, AT LEAST ONE     │
│   IMPEDIMENT ASSOCIATED WITH THE PROJECT IMPLEMENTATION      │
│                        FRAMEWORK                             │
│                          1608                                │
└─────────────────────────────────────────────────────────────┘
```

FIG. 16

ARTIFICIAL INTELLIGENCE BASED PROJECT IMPLEMENTATION

PRIORITY

This application is a Non-Provisional application of commonly assigned and co-pending India Provisional Application Serial Number 201911043328, filed Oct. 24, 2019, the disclosure of which is hereby incorporated by reference in its entirety.

BACKGROUND

A variety of techniques may be used for project implementation. With respect to project implementation generally, a team may be identified to implement a project plan. The project plan may include aspects such as a project timeline, and if the project plan is not executed properly, the project plan and/or personnel, equipment, timeline, etc., associated with the project plan may be modified.

BRIEF DESCRIPTION OF DRAWINGS

Features of the present disclosure are illustrated by way of example and not limited in the following figure(s), in which like numerals indicate like elements, in which:

FIG. 16 illustrates a flowchart of an example method for artificial intelligence based project implementation in accordance with an example of the present disclosure.

DETAILED DESCRIPTION

Figure 1:
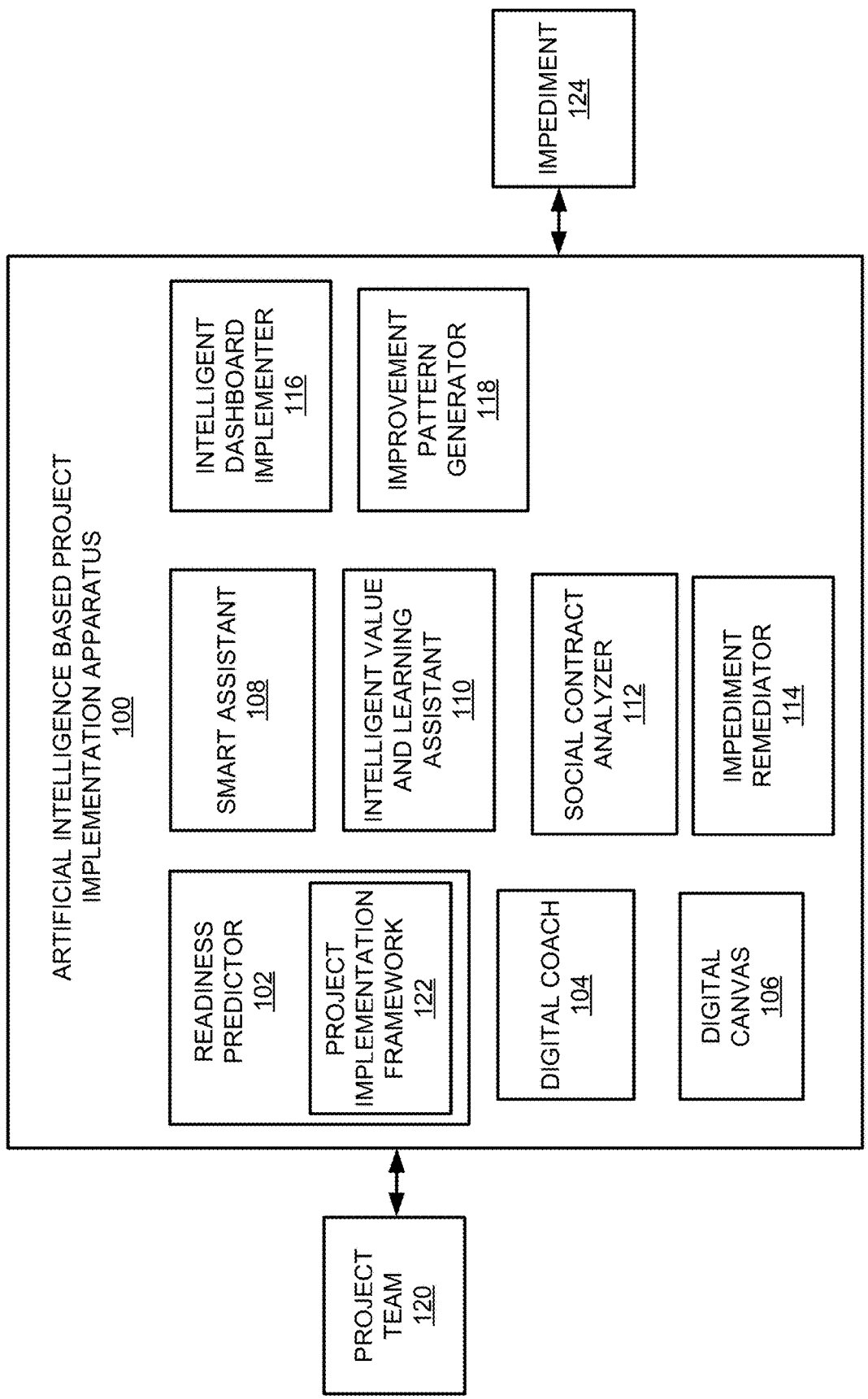
FIG. 1 illustrates a layout of an artificial intelligence based project implementation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence based project implementation apparatuses, methods for artificial intelligence based project implementation, and non-transitory computer readable media having stored thereon machine readable instructions to provide artificial intelligence based project implementation are disclosed herein. The apparatuses, methods, and non-transitory computer readable media disclosed herein provide for artificial intelligence based project implementation by planning a project implementation framework in a hyper effective and Agile manner. In this regard, the apparatuses, methods, and non-transitory computer readable media disclosed herein provide for a reduction of time expended towards implementation of a project. The apparatuses, methods, and non-transitory computer readable media disclosed herein may provide project implementation, for example, with respect to a Dojo delivery agility (DDA) framework.

With respect to the DDA framework (hereinafter referred to as the project implementation framework), the project implementation framework may represent a product development framework. The project implementation framework may be utilized by project members to work in a specified manner. For example, the specified manner may represent an Agile way of working. With respect to Agile, in the area of software development, one technique includes Agile project management.

The project implementation framework as disclosed herein may be built on the concept of hyper sprint to enable teams to build E-shaped skills. The E-shaped skills may be implemented to increase productivity and predictability. The project implementation framework may be rooted to Agile values and associated principles. In order to help teams move to a next level of agility, the project implementation framework may be planned in a hyper effective and agile manner based on implementation of artificial intelligence as disclosed herein. In this regard, with respect to projects and processes, it is technically challenging to manage information in a digital form, whether the information was created digitally (e.g., email, Word documents, Excel spreadsheet, e-forms, etc.), or whether the information was converted from hardcopy (e.g., scanned documents).

The apparatuses, methods, and non-transitory computer readable media disclosed herein may address the aforementioned technical challenges by utilizing artificial intelligence to enhance the speed, precision, and effectiveness of implementation of the project implementation framework as disclosed herein. In this regard, artificial intelligence capabilities may be utilized as disclosed herein to identify, predict, and resolve impediments, which may expedite outcomes and may further increase the quality and accuracy of the outcomes. An impediment may be described as any technical challenge that may occur with respect to implementation of a project. Examples of impediments may include a technical challenge associated with operation of a test server, a technical challenge faced by a project team towards completion of a task, integration of code in an existing system, etc. In this regard, the apparatuses, methods, and non-transitory computer readable media disclosed herein may provide for control, for example, of a system, such as a server or any computerized device generally that may be implemented for a project, based on the identification of the impediment. For example, when an impediment associated with operation of a test server is identified, the apparatuses, methods, and non-transitory computer readable media disclosed herein may provide for control (e.g., shut-down) of the test server. Similarly, when an impediment associated with integration of code in an existing system is identified, the apparatuses, methods, and non-transitory computer readable media disclosed herein may provide for control of an application to remove the application from service until the impediment is addressed.

The apparatuses, methods, and non-transitory computer readable media disclosed herein may further address the aforementioned technical challenges by capturing and maintaining documents and data in real-time. These aspects may provide for elimination of transcription errors, implementation of electronic workflow processes, creation of audit trails, and creation of one source of truth for each document/item of data, as well as improvement of accessibility to information.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

Figure 2:
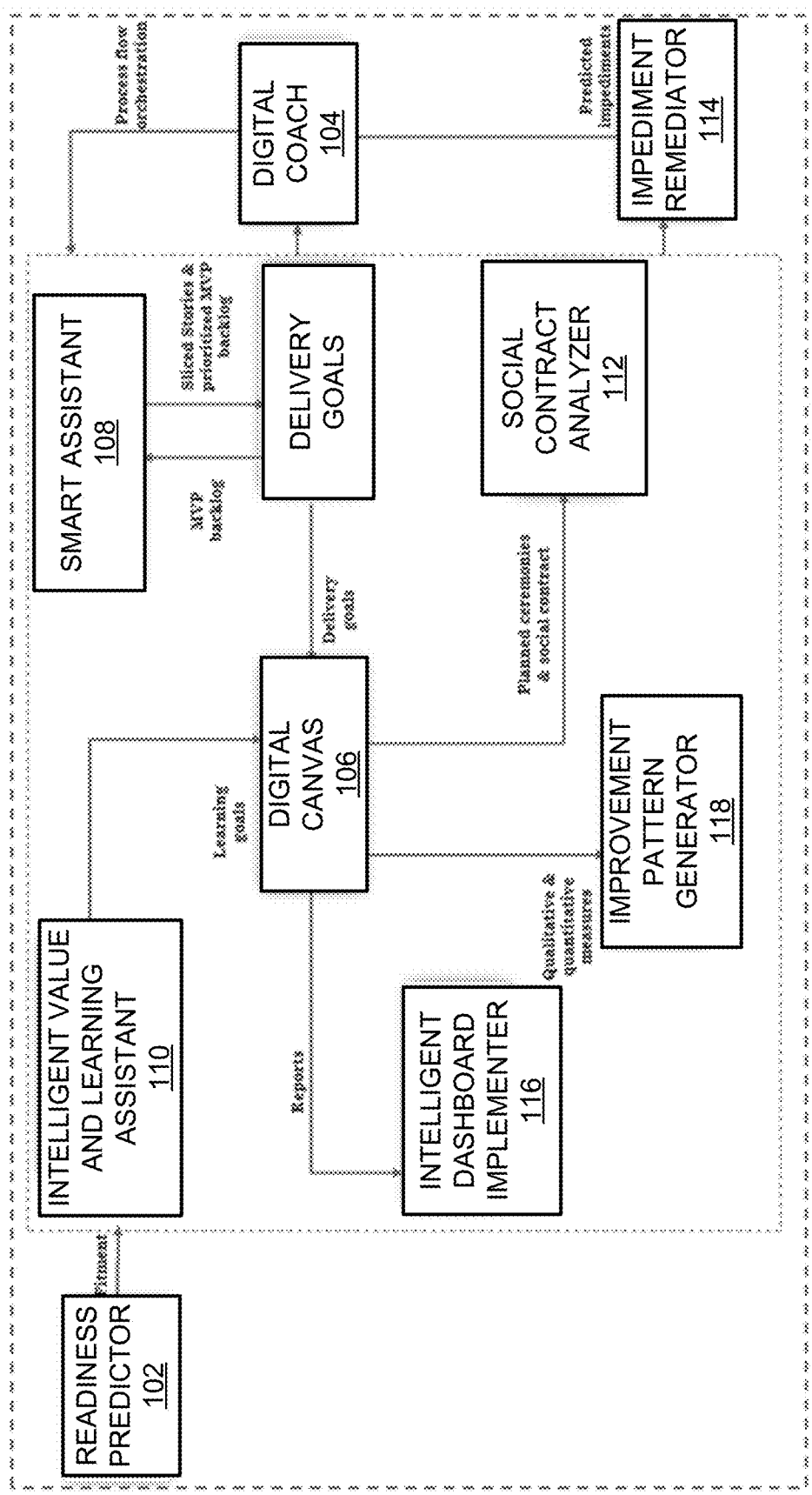
FIG. 2 illustrates a logical flow diagram of the artificial intelligence based project implementation apparatus of FIG. 1 in accordance with an example of the present disclosure.

FIG. 1 illustrates a layout of an example artificial intelligence based project implementation apparatus (hereinafter also referred to as "apparatus 100"). FIG. 2 illustrates a logical flow diagram of the apparatus 100 in accordance with an example of the present disclosure.

Referring to FIGS. 1 and 2, the apparatus 100 may include a readiness predictor 102 that is executed by at least one hardware processor (e.g., the hardware processor 1502 of FIG. 15, and/or the hardware processor 1704 of FIG. 17) to allow a project team 120 to self-evaluate their viability for utilizing the project implementation framework 122 for a specified way of working by reducing dependency on personnel. For example, the readiness predictor 102 may implement, for a project team 120, self-evaluation of viability for utilizing a project implementation framework 122. The readiness predictor 102, as disclosed in further detail with respect to FIGS. 13 and 14, may consider three dimensions of realignment (e.g., scope, team, and mindset), and may provide a specified technique of assessing a team's readiness for utilization of the project implementation framework.

A digital coach 104 that is executed by at least one hardware processor (e.g., the hardware processor 1502 of FIG. 15, and/or the hardware processor 1704 of FIG. 17) may represent a smart conversational and interactive BOT. The digital coach 104 may be utilized to guide a team on utilization of the project implementation framework 122, thereby reducing dependency on other personnel. The digital coach 104 may account for process and context. The digital coach 104 may guide team members on a logical flow associated with the project implementation framework, and may orchestrate the logical flow for the team members, based, for example, on timelines and process flow to facilitate utilization of the project implementation framework.

The digital coach 104 may provide access to insights and predictions being generated by other assistants. In this regard, the readiness predictor 102 may provide for a viability result, assessment viability details, recommendations, and predictions. The readiness predictor 102 may store value board outcomes, progress achieved and actions library. The readiness predictor 102 may have access to information captured in the digital canvas 106. The readiness predictor 102 may include a configurable recommendations library which is provided to the users when deviations in thresholds are observed or when deviations are predicted. The readiness predictor 102 may include a process workflow containing process, activities and timelines that are used to advise on particular process and timelines. Further, the readiness predictor 102 may provide access to impediments log and insights such as rate at which impediments were resolved.

Figure 3:
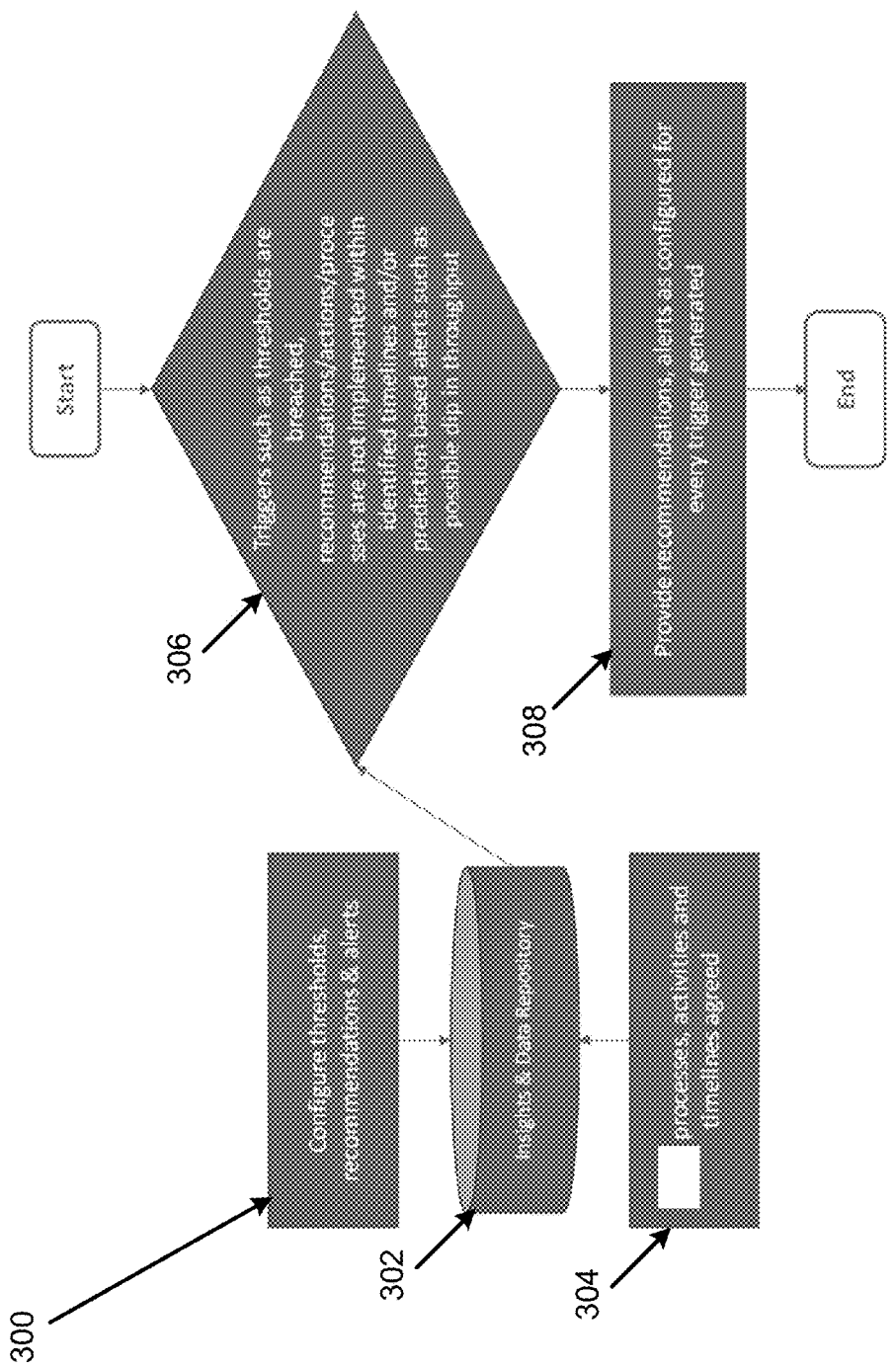
FIG. 3 illustrates a process flow associated with a digital coach of the artificial intelligence based project implementation apparatus of FIG. 1 in accordance with an example of the present disclosure.

FIG. 3 illustrates a process flow associated with the digital coach 104 in accordance with an example of the present disclosure.

Referring to FIG. 3, the process flow provides details of how the digital coach 104 guides a team by accounting for process and context. For example, the digital coach 104 may guide the project team 120 on utilization of the project implementation framework 122 by specifying processes, activities, and timelines associated with utilization of the project implementation framework 122. For example, at 300, the digital coach 104 may configure thresholds, recommendations, and alerts. At 302, the digital coach 104 may ascertain insights from a data repository. At 304, the digital coach 104 may analyze processes, activities, and timelines agreed. Based on evaluation of triggers that may be breached at 306, at 308, the digital coach 104 may provide recommendations with respect to each trigger.

With respect to examples of operation of the digital coach 104, the digital coach 104 may store recommendations provided by the readiness predictor 102 such as 'check the feasibility of having video conferencing facility for major sprint ceremony', and follow up with the action owner(s) identified for its implementation. According to another example, the digital coach 104 may have access to outcome of intelligent value and learning such as improving the quality from an existing trend of ten defects per sprint to one defect per sprint, and therefore suggesting appropriate quality improvement actions such as implementing mutation testing. The digital coach may also keep track of a defect per sprint trend by analyzing a defects log of an Agile lifecycle management tool. According to a further example, the digital coach 104 may interpret insights provided by the improvement pattern generator 118 such as dip in throughput, and generate an associated notification in the form of an alert.

A digital canvas 106 that is executed by at least one hardware processor (e.g., the hardware processor 1502 of FIG. 15, and/or the hardware processor 1704 of FIG. 17) may facilitate documentation of all discussions in a digital format during envisioning, and maintain the documented information for reference at any time during execution of a journey associated with the project implementation framework. For example, the digital canvas 106 may document a discussion by the project team 120 in a digital format during envisioning associated with the project implementation framework 122. Further, the digital canvas 106 may maintain documented information for reference during execution, by the project team 120, of a journey associated with the project implementation framework 122.

The digital canvas 106 may represent a live document which captures all information in a digital format during a journey. The digital canvas 106 may improve transparency and reliable up-to-date information availability for all stakeholders. The digital canvas 106 may represent a single source of truth for all information related to a team's journey. The digital canvas 106 may maintain a standard and structured approach, across all executions, during squad envisioning. The digital canvas 106 may include an artificial intelligence engine to ensure its ability to convert scanned images and pictures into information, using optical character recognition technology, and improve the ease of use and maintainability. The digital canvas 106 may create a digital format to store the values of each field. A team may type-in each field in the digital canvas 106. A team may edit any field (except static fields such as current KPIs). The digital canvas 106 may utilize intelligent information radiators to customize the view of a dashboard.

Figure 4:
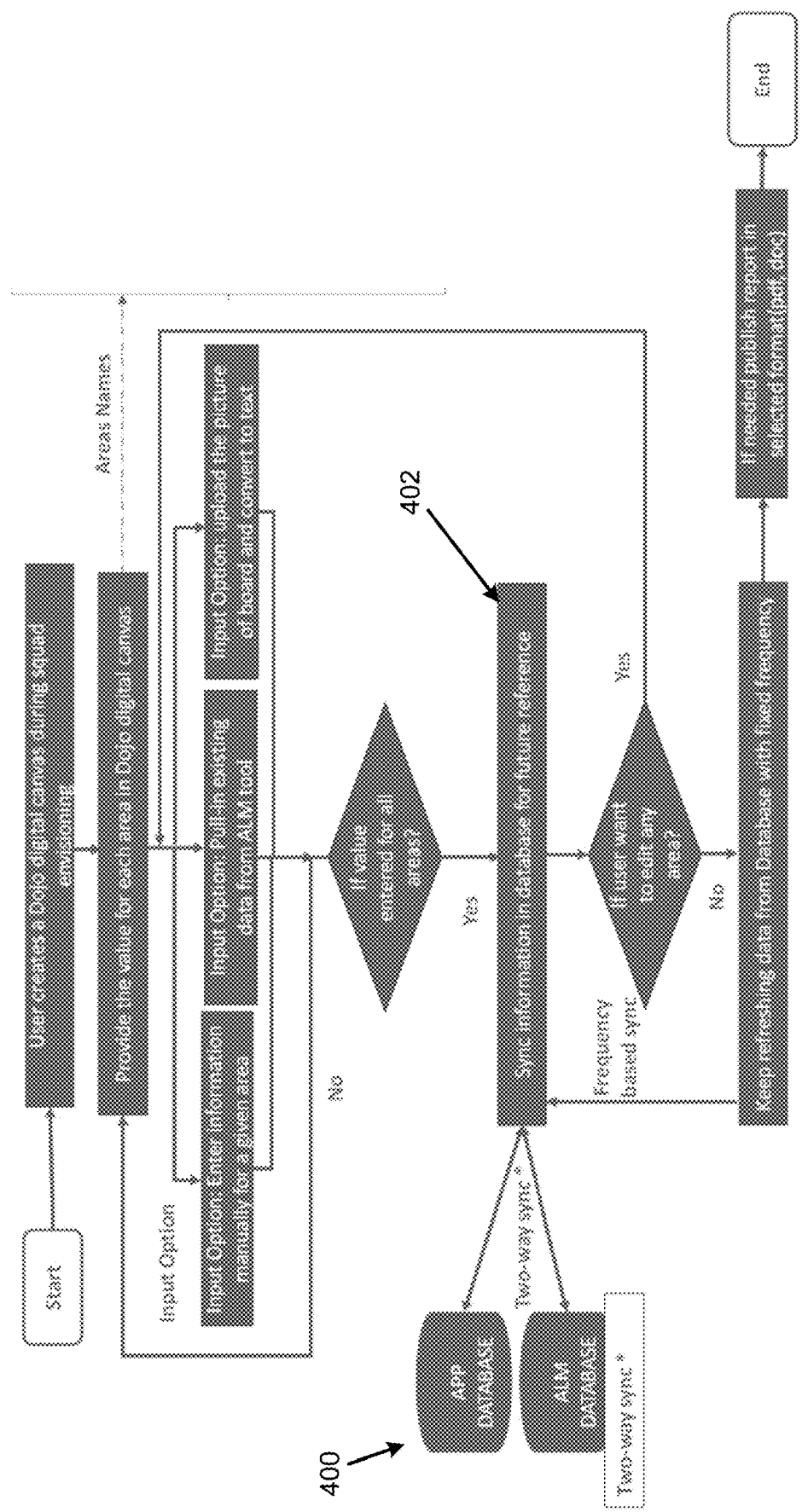
FIG. 4 illustrates a process flow associated with a digital canvas of the artificial intelligence based project implementation apparatus of FIG. 1 in accordance with an example of the present disclosure.

FIG. 4 illustrates a process flow associated with the digital canvas 106 in accordance with an example of the present disclosure.

Referring to FIG. 4, the digital canvas 106 may document the discussion by the project team 120 in the digital format during envisioning associated with the project implementation framework 122, and maintain documented information for reference during execution, by the project team 120, of the journey associated with the project implementation framework 122. In this regard, the digital canvas 106 may document, using at least two databases (e.g., at 400) to perform a two-way sync operation, the discussion by the project team 120 in the digital format during envisioning associated with the project implementation framework 122. Further, the digital canvas 106 may maintain, using the at least two databases to perform the two-way sync operation, the documented information for reference (e.g., at 402) during execution, by the project team, of the journey associated with the project implementation framework.

A smart assistant 108 that is executed by at least one hardware processor (e.g., the hardware processor 1502 of FIG. 15, and/or the hardware processor 1704 of FIG. 17) may provide for implementation of specified techniques, such as a sad, happy, exceptional, quality, constraints (SHEQC) technique, of dividing (e.g., slicing) requirements with artificial intelligence capabilities. In this regard, a team may analyze complex requirements to produce a demonstration for generating feedback, and triggering the correct conversations in a specified time duration (e.g., a hyper sprint of 2.5 days).

Figure 5:
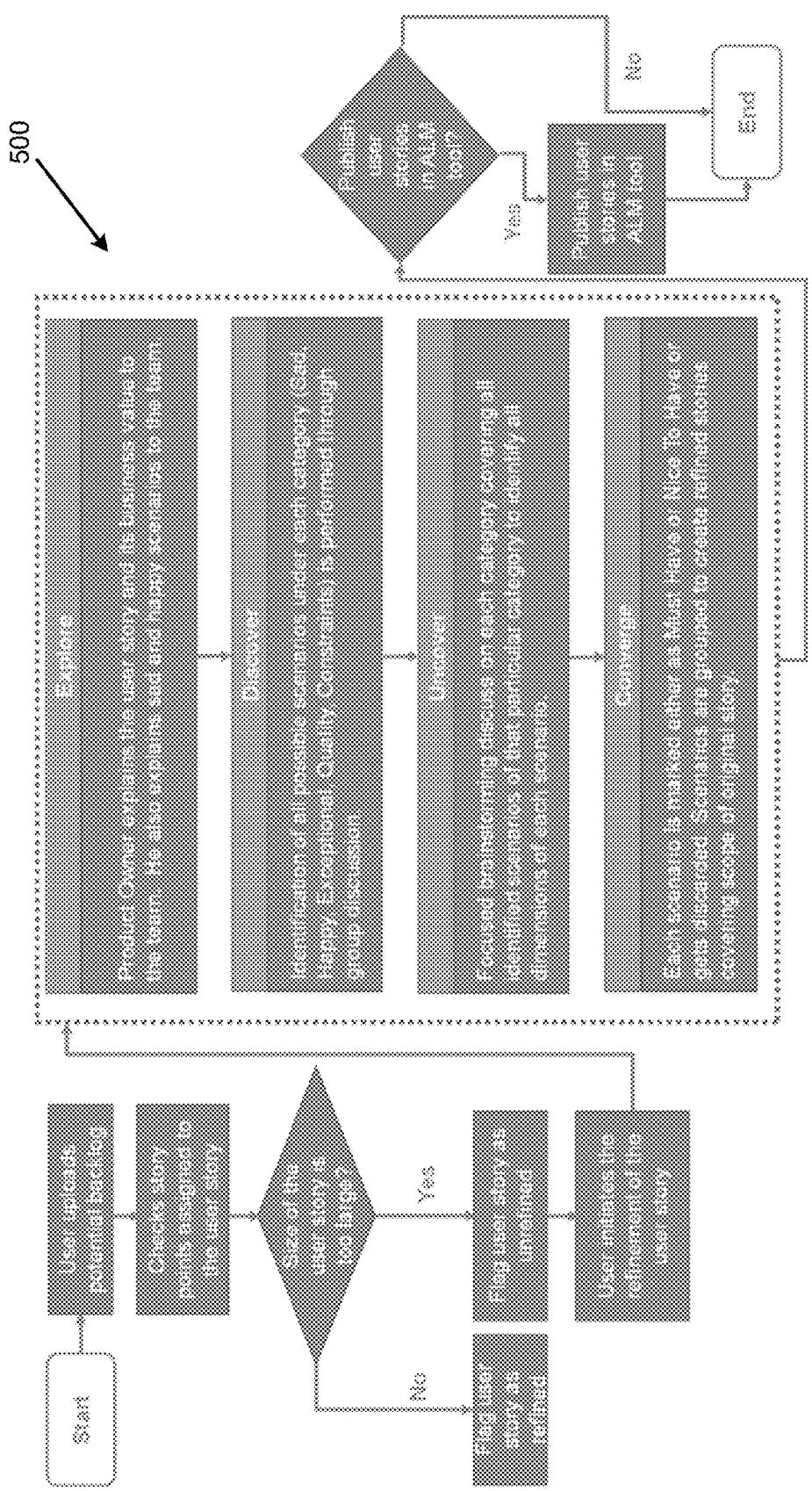
FIG. 5 illustrates a process flow associated with a smart assistant of the artificial intelligence based project implementation apparatus of FIG. 1 in accordance with an example of the present disclosure.

FIG. 5 illustrates a process flow associated with the smart assistant 108 in accordance with an example of the present disclosure.

Referring to FIG. 5, the process flow describes dividing of requirements. For example, the smart assistant 108 may implement a specified technique of dividing requirements (e.g., at 500) associated with the project implementation framework 122.

An intelligent value and learning assistant 110 that is executed by at least one hardware processor (e.g., the hardware processor 1502 of FIG. 15, and/or the hardware processor 1704 of FIG. 17) may represent a smart tool that enables creative problem-solving techniques to design a value board that creates visibility as to why a learning goal is chosen and what a team will achieve.

The intelligent value and learning assistant 110 may enable a creative problem-solving technique (linked with KPIs and values) to design a value board which creates visibility as to why the learning goals are chosen and what values a team will achieve. Learning goals may be monitored by setting baselines, establishing a tracking mechanism, reviewing and adjusting the same, and publishing reports for measuring the same. The intelligent value and learning assistant 110 may provide recommendations to adopt specific learning goals based on the team's top challenges. The intelligent value and learning assistant 110 may utilize historic data to provide recommendations, which results in reduction of the time and effort of teams and coaches who start adopting the project implementation framework. This helps teams in acquiring E-shaped skills which may be monitored, radiated and published. The intelligent value and learning assistant 110 may issue alerts, prescribe next steps, and suggest ways to optimize processes. This dashboard may be intelligent, predictive, timely, and conversational.

Figure 6:
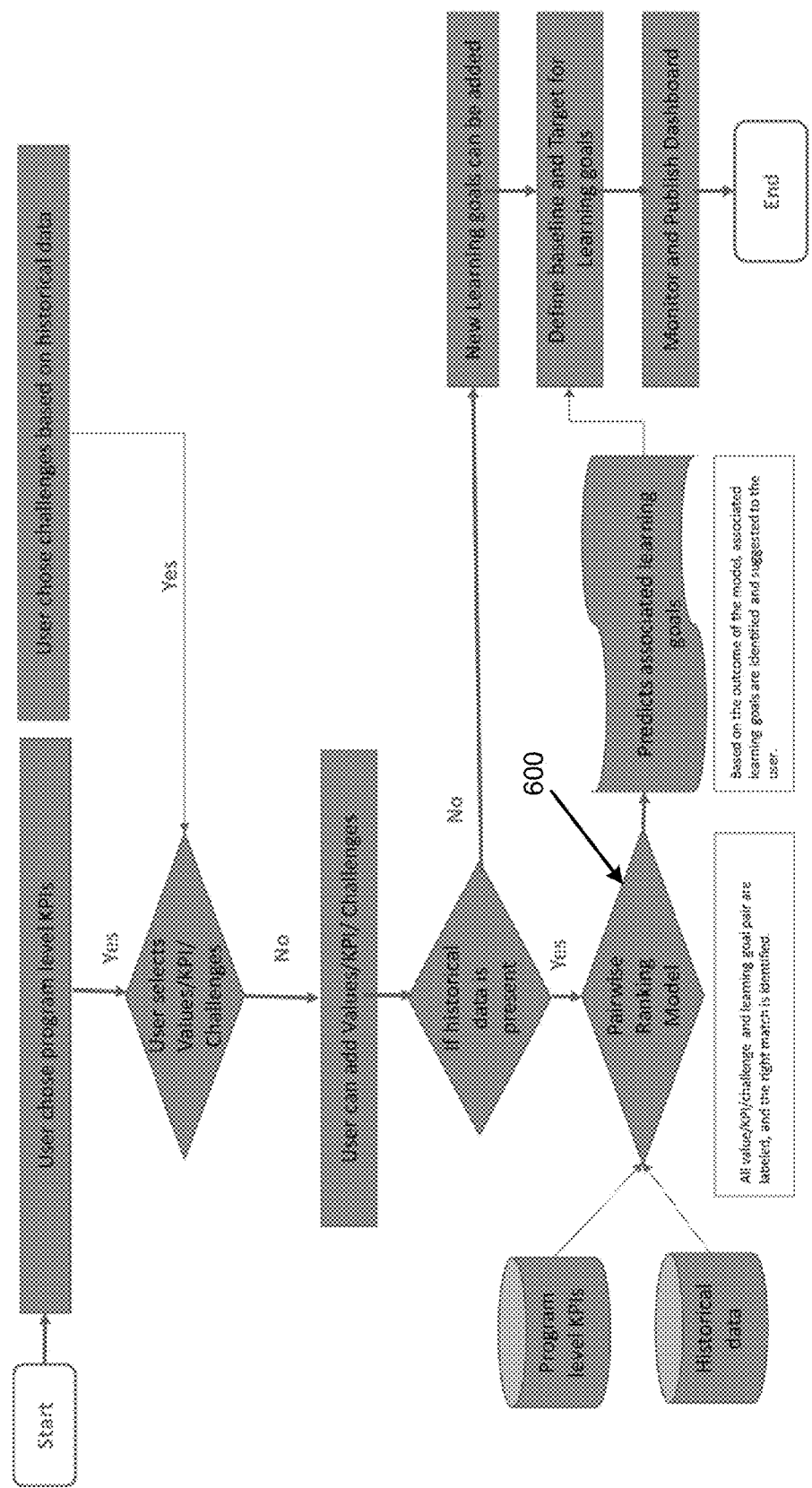
FIG. 6 illustrates a process flow associated with the intelligent value and learning assistant of the artificial intelligence based project implementation apparatus of FIG. 1 in accordance with an example of the present disclosure.

FIG. 6 illustrates a process flow associated with the intelligent value and learning assistant 110 in accordance with an example of the present disclosure.

Referring to FIG. 6, the intelligent value and learning assistant 110 may implement at least one problem-solving technique for design of a value board associated with the project implementation framework. In this regard, at 600, the intelligent value and learning assistant 110 may utilize a pairwise ranking model to generate at least one learning goal associated with the project implementation framework 122. For example, the pairwise ranking model may utilize historical data (if present) and program level key performance indicators (KPIs) to generate at least one learning goal associated with the project implementation framework 122.

Based on the learning goals, at 602, the intelligent value and learning assistant 110 may define a baseline and a target for the learning goals.

A social contract analyzer 112 that is executed by at least one hardware processor (e.g., the hardware processor 1502 of FIG. 15, and/or the hardware processor 1704 of FIG. 17) may represent an intelligent mechanism that may evaluate, during execution of the journey (e.g., a set of processes associated with the project implementation framework 122), implementation of a social contract (e.g., an agreement amongst members of the project team) by the project team 120. The social contract analyzer 112 may determine, based on the implementation of the social contract by the project team 120, whether the social contract is not implemented for at least one specified occurrence of a social contract requirement associated with the project implementation framework. In this regard, the social contract analyzer 112 may identify, based on a determination that the social contract is not implemented for the at least one specified occurrence of the social contract requirement associated with the project implementation framework 122, at least one impediment 124 (e.g., hindrance) associated with the project implementation framework 122. The social contract analyzer 112 may provide for the implementation of appropriate actions by a team to facilitate self-organization by the team.

Figure 7:
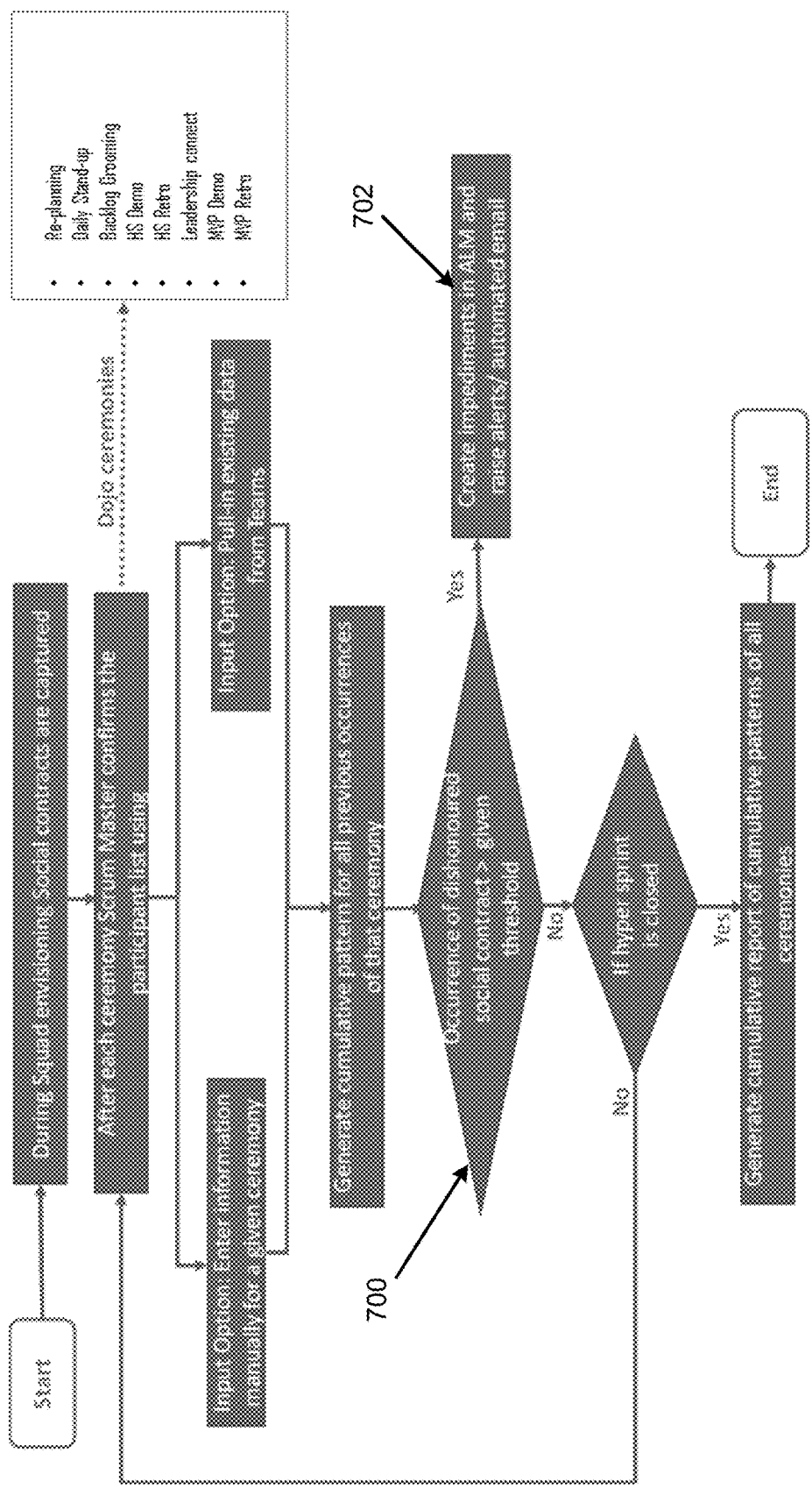
FIG. 7 illustrates a process flow associated with a social contract analyzer of the artificial intelligence based project implementation apparatus of FIG. 1 in accordance with an example of the present disclosure.

FIG. 7 illustrates a process flow associated with the social contract analyzer 112 in accordance with an example of the present disclosure.

Referring to FIG. 7, the process flow illustrates how impediments are identified, and how appropriate actions are determined and implemented. For example, the social contract analyzer 112 may evaluate, during execution of the journey, implementation of the social contract by the project team 120, determine, based on the implementation of the social contract by the project team 120, whether the social contract is not implemented for at least one specified occurrence of a social contract requirement associated with the project implementation framework 122, and identify, based on the determination that the social contract is not implemented for the at least one specified occurrence of a social contract requirement associated with the project implementation framework 122, the at least one impediment 124 associated with the project implementation framework 122 by determining (e.g., at 700) whether a number of occurrences of a dishonored (e.g., violated) social contract is greater than a specified social contract threshold. Based on a determination that the number of occurrences of the dishonored social contract is greater than the specified social contract threshold, at 702, the social contract analyzer 112 may generate the at least one impediment 124 associated with the project implementation framework.

An impediment remediator 114 that is executed by at least one hardware processor (e.g., the hardware processor 1502 of FIG. 15, and/or the hardware processor 1704 of FIG. 17) may analyze, predict, and remediate impediments. In this regard, the impediment remediator 114 may remediate impediments, and/or forward impediments to appropriate personnel for remediation. For example, the impediment remediator 114 may remediate the identified at least one impediment 124 associated with the project implementation framework.

Figure 8:
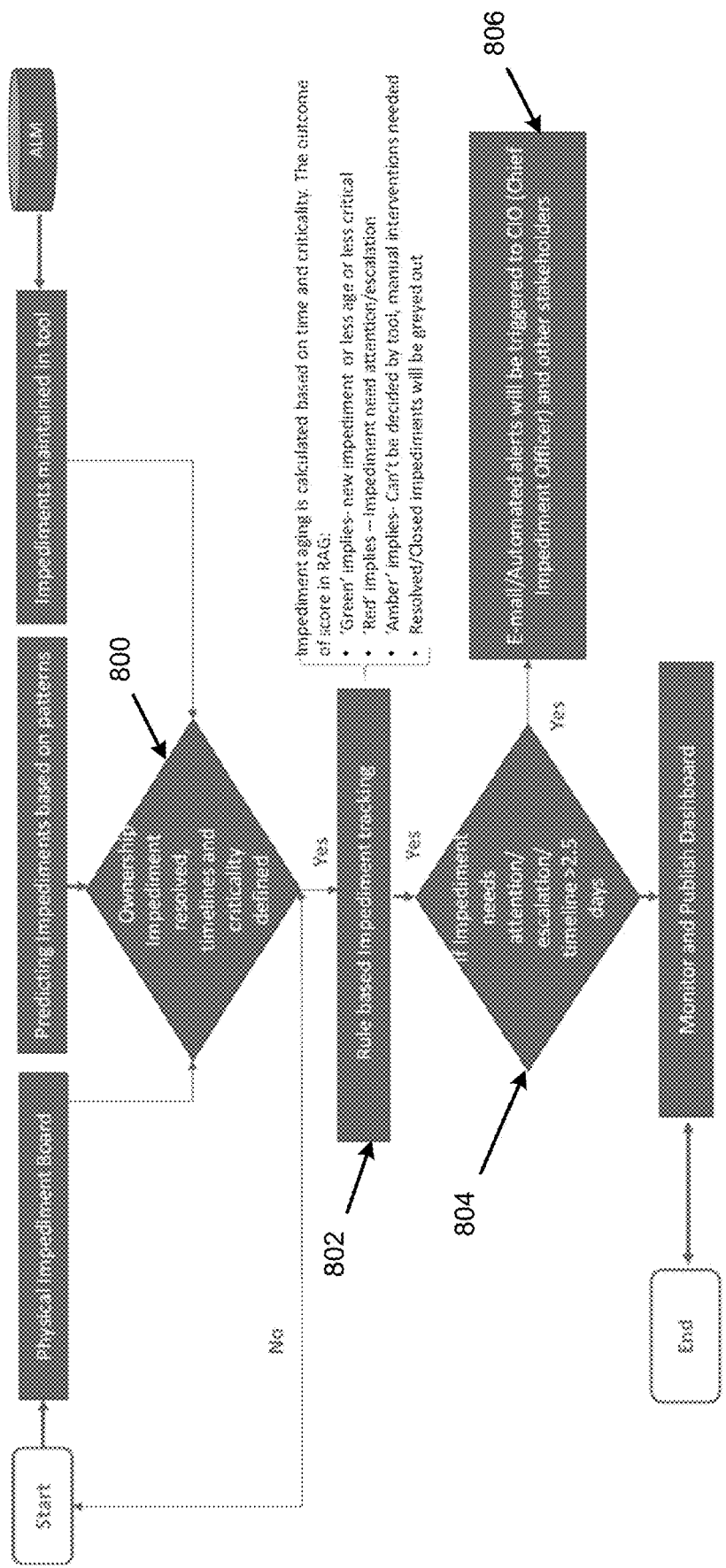
FIG. 8 illustrates a process flow associated with the impediment remediator of the artificial intelligence based project implementation apparatus of FIG. 1 in accordance with an example of the present disclosure.

FIG. 8 illustrates a process flow associated with the impediment remediator 114 in accordance with an example of the present disclosure.

Referring to FIG. 8, the process flow illustrates how impediments are analyzed, predicted and remediated. In this regard, at 800, the impediment remediator 114 may determine whether any ownership impediments have been resolved.

At 802, based on a determination that ownership impediments are resolved, the impediment remediator 114 may perform rule based impediment tracking.

At 804, the impediment remediator 114 may determine whether an impediment needs attention (e.g., based on whether the impediment has exceeded a specified threshold, such as 2.5 days).

At 806, based on a determination that the impediment needs attention, the impediment remediator 114 may trigger an alert.

Figure 9:
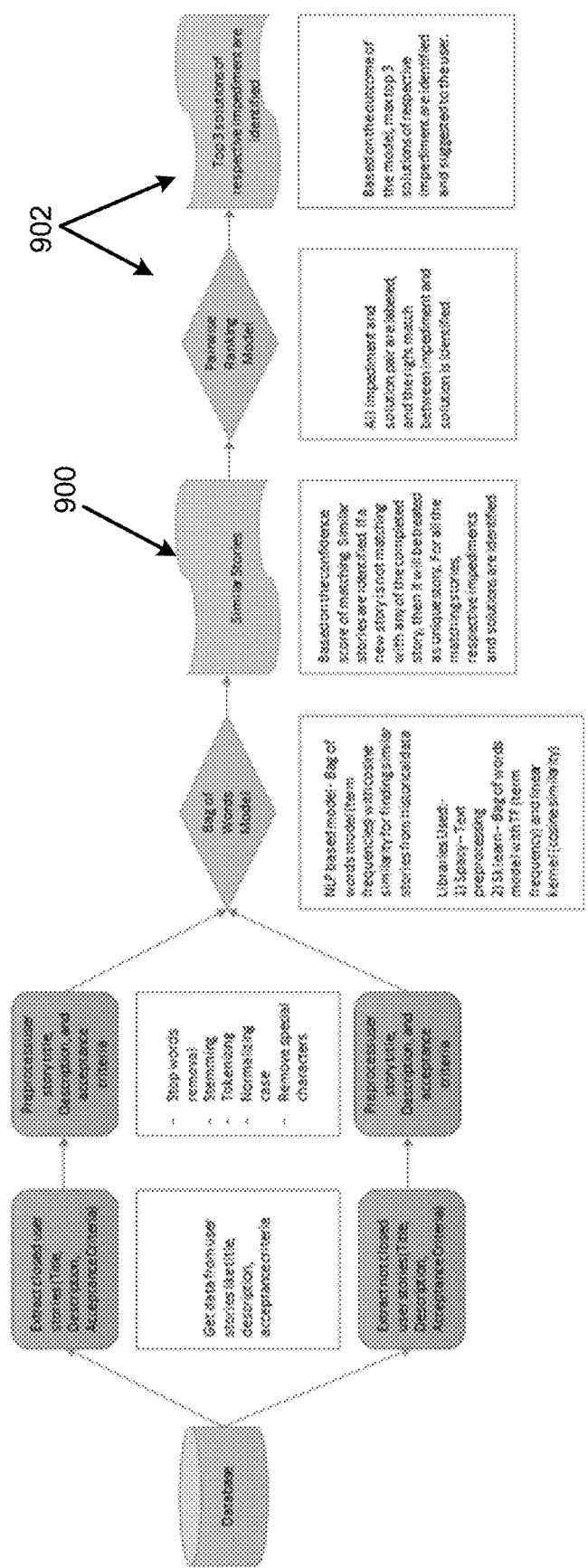
FIG. 9 illustrates a workflow associated with the impediment remediator of the artificial intelligence based project implementation apparatus of FIG. 1 in accordance with an example of the present disclosure.

FIG. 9 illustrates a workflow associated with the impediment remediator 114 in accordance with an example of the present disclosure.

Referring to FIG. 9, the impediment remediator 114 may remediate the identified at least one impediment 124 associated with the project implementation framework 122 by identifying (e.g., at 900), based on a confidence level analysis associated with the project implementation framework 122, similar stories. The impediment remediator 114 may identify (e.g., at 902), from each of the identified similar stories, at least one similar impediment to the identified at least one impediment 124 associated with the project implementation framework 122 and a solution to the at least one similar impediment. Further, the impediment remediator 114 may remediate, based on the identified solution to the at least one similar impediment, the identified at least one impediment 124 associated with the project implementation framework 122.

An intelligent dashboard implementer 116 that is executed by at least one hardware processor (e.g., the hardware processor 1502 of FIG. 15, and/or the hardware processor 1704 of FIG. 17) may implement an artificial intelligence enabled dashboard to provide visualizations, for example, of required metrics, measures, and impediments. The intelligent dashboard implementer 116 may identify trends with real-time monitoring of relevant applications, and may determine (e.g., predict) an impact of missing targets, and timelines.

Figure 10:
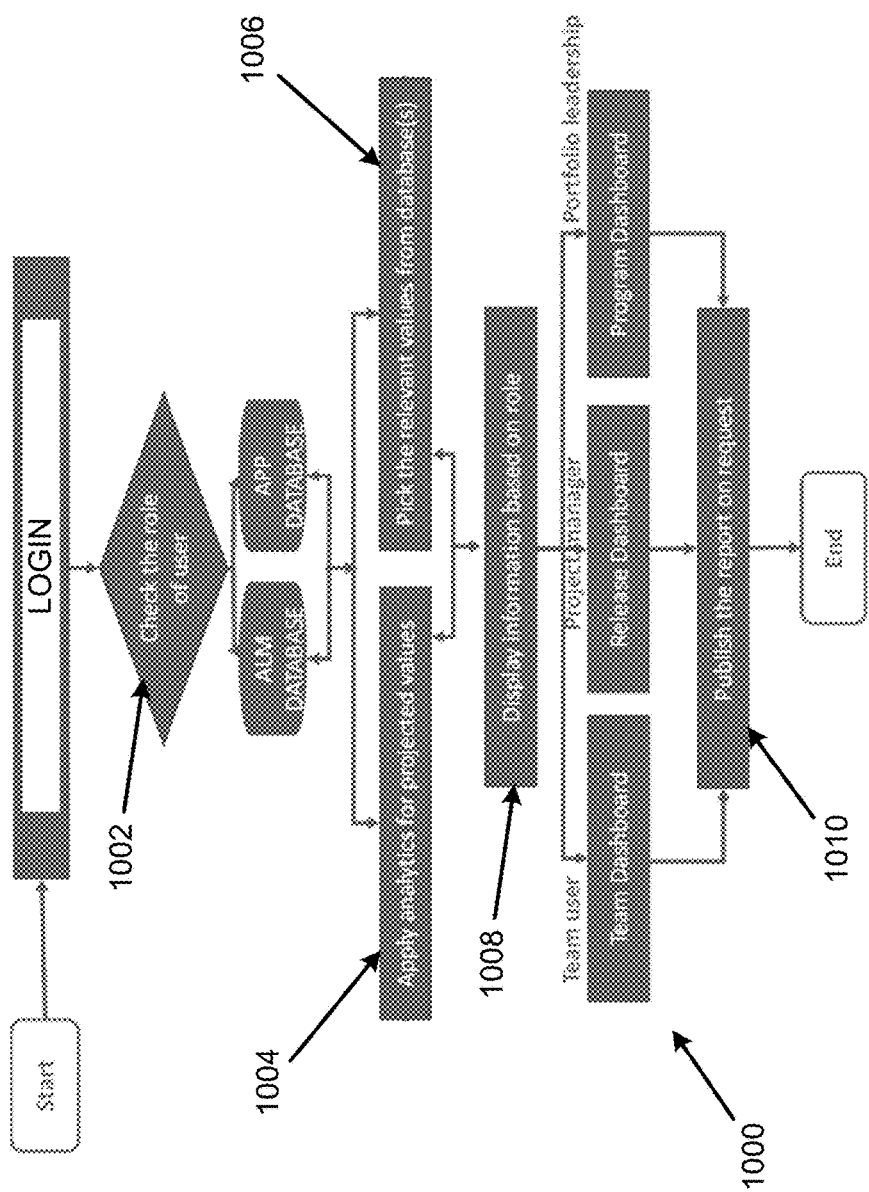
FIG. 10 illustrates a process flow associated with the intelligent dashboard implementer of the artificial intelligence based project implementation apparatus of FIG. 1 in accordance with an example of the present disclosure.

FIG. 10 illustrates a process flow associated with the intelligent dashboard implementer 116 in accordance with an example of the present disclosure.

Referring to FIG. 10, the process flow illustrates analysis used to provide visualizations, trend identification, and prediction of an impact of missing targets and timelines. For example, the intelligent dashboard implementer 116 may implement an artificial intelligence enabled dashboard (e.g., at 1000) to provide visualizations of at least one of metrics, measures, or the impediments associated with the project implementation framework 122. In this regard, based on a user role specified at 1002, at 1004 and 1006 the intelligent dashboard implementer 116 respectively apply analytics for projected values and select relevant values from an Agile lifecycle management database or an application database. At 1008, information from blocks 1004 and 1006 may be displayed based on a user role, such as at 1000 (e.g., team user, project manager, portfolio leadership, etc.). At 1010, a report may be published upon request.

An improvement pattern generator 118 that is executed by at least one hardware processor (e.g., the hardware processor 1502 of FIG. 15, and/or the hardware processor 1704 of FIG. 17) may represent a smart artificial intelligence powered assistant that facilitates creation of quantitative and qualitative measures for parameters such as productivity, predictability, and happiness index.

Figure 11A:
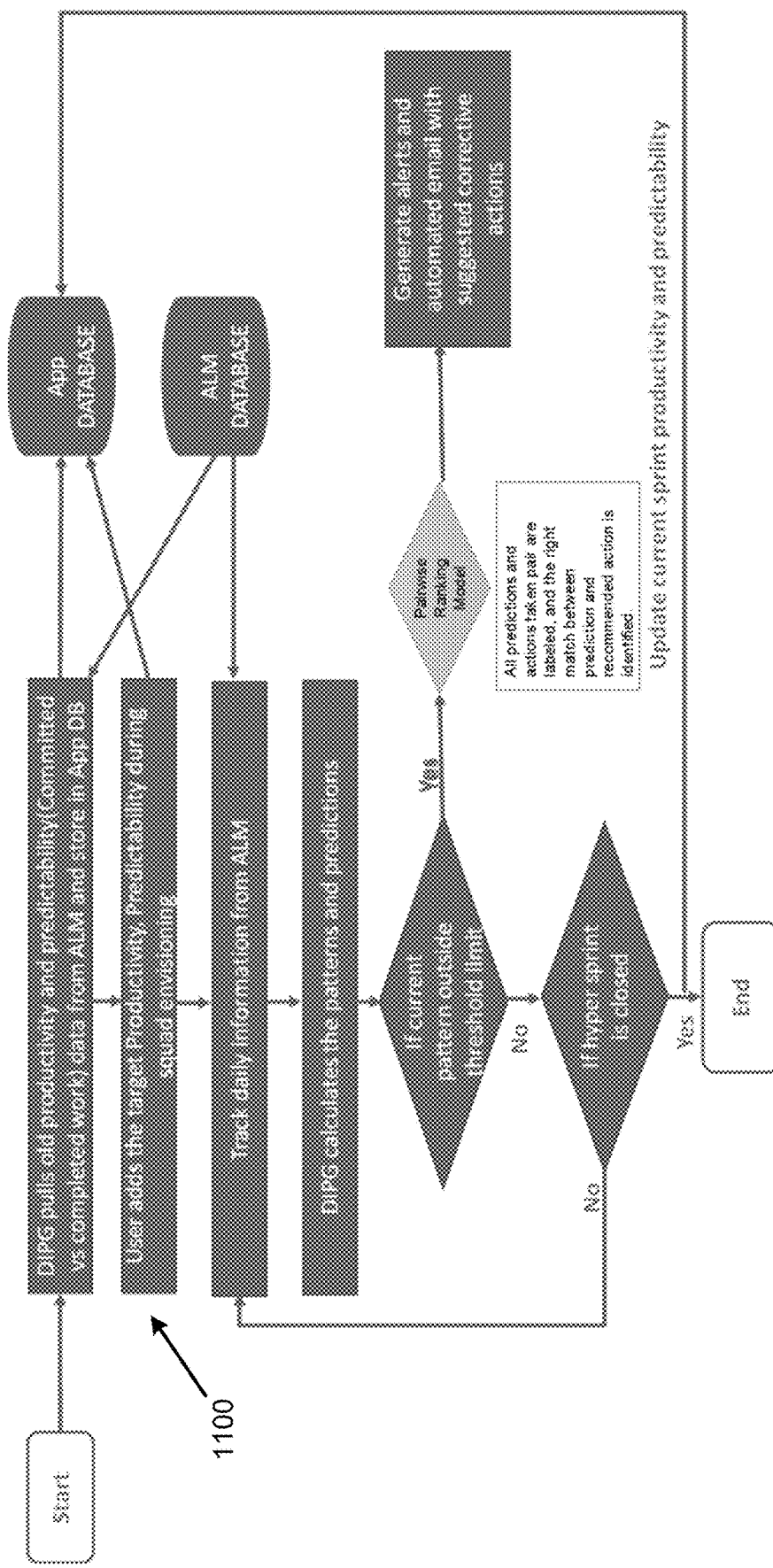
FIGS. 11A and 11B illustrate process flows associated with the improvement pattern generator of the artificial intelligence based project implementation apparatus of FIG. 1 in accordance with an example of the present disclosure.
Figure 11B:
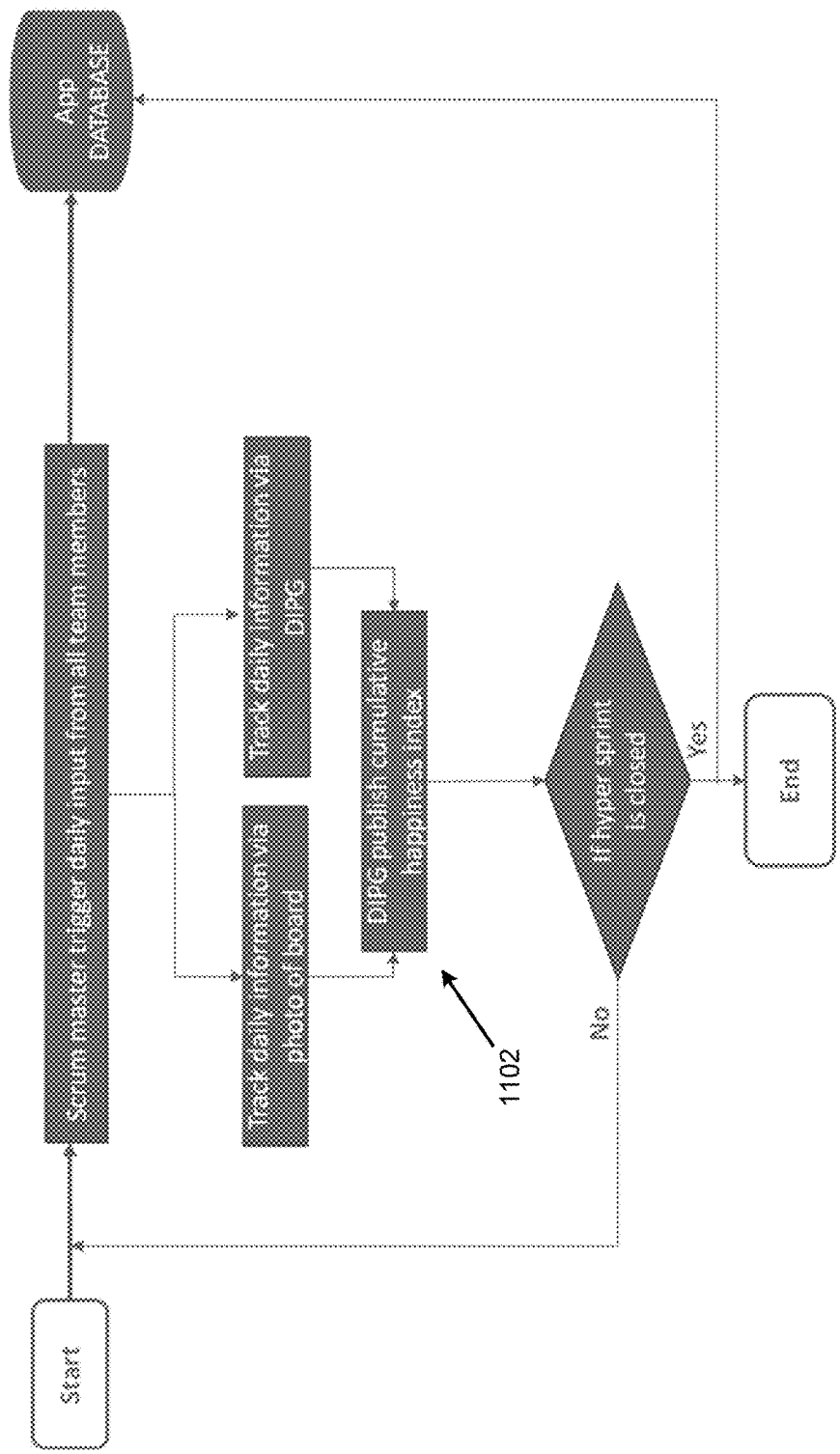

FIGS. 11A and 11B illustrate process flows associated with the improvement pattern generator 118 in accordance with an example of the present disclosure.

Referring to FIG. 11A, the process flow illustrates analysis for creation of quantitative and qualitative measures for parameters such as productivity, predictability, and happiness index. For example, the improvement pattern generator 118 may generate (e.g., at 1100) measures for parameters that include at least one of productivity, predictability, or happiness index associated with the project implementation framework.

In a similar manner as FIG. 11A, for FIG. 11B, the improvement pattern generator 118 may generate measures for parameters that include at least one of productivity, predictability, or happiness index (e.g., at 1102) associated with the project implementation framework.

Figure 12:
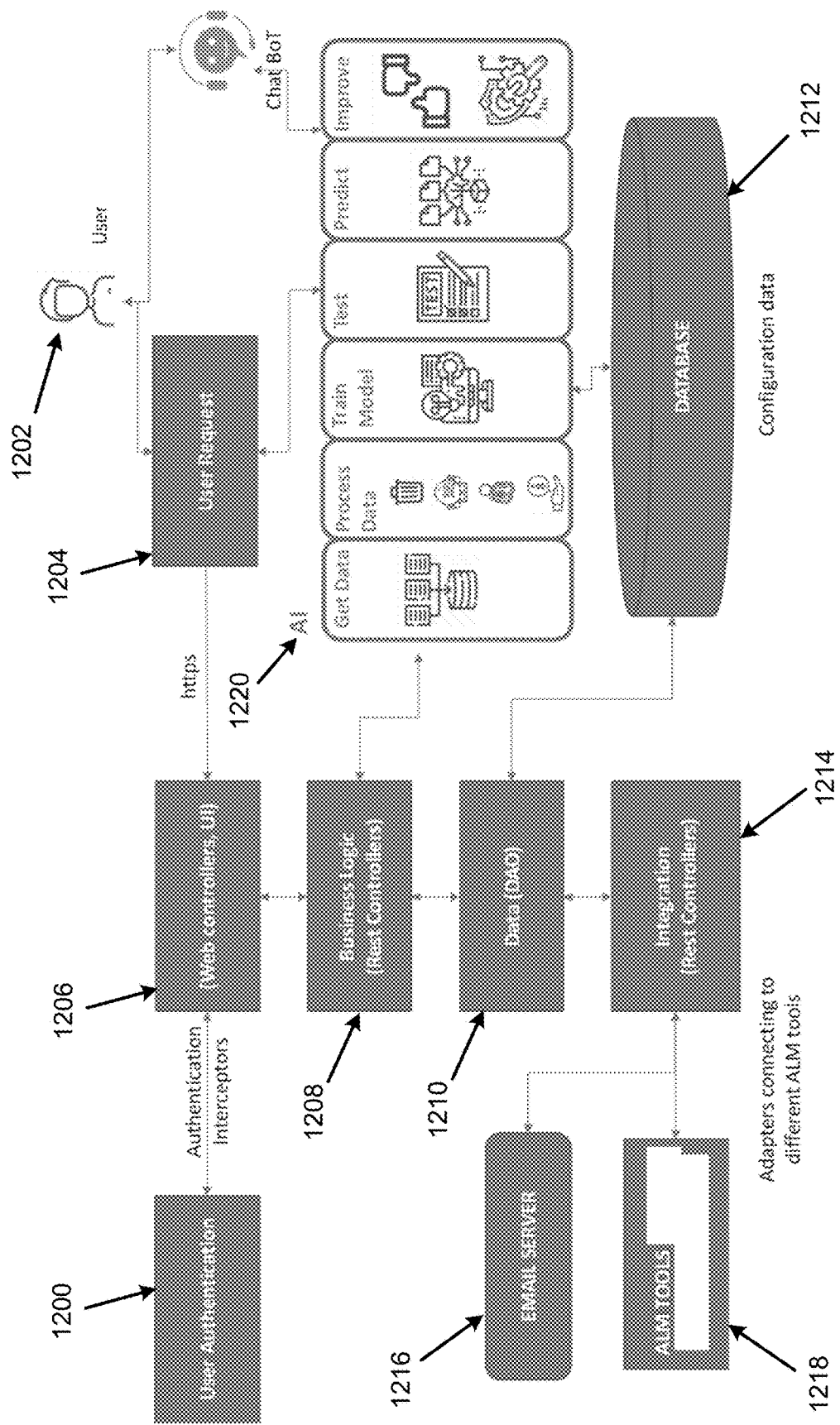
FIG. 12 illustrates a technical architecture associated with the digital coach of the artificial intelligence based project implementation apparatus of FIG. 1 in accordance with an example of the present disclosure.

FIG. 12 illustrates a technical architecture associated with various components of the apparatus 100, such as the readiness predictor 102, the digital coach 104, the digital canvas 106, the smart assistant 108, the intelligent value and learning assistant 110, the social contract analyzer 112, the impediment remediator 114, the intelligent dashboard implementer 116, and the improvement pattern generator 118, in accordance with an example of the present disclosure.

Referring to FIG. 12, the technical architecture may include user authentication at 1200 for a user 1202 that may generate a user request 1204 associated with the project team 120. The technical architecture may include various other processes related to user authentication such as implementation of web controllers and/or a user interface at 1206 to input the user request, Rest controllers at 1208, data obtained via a data access object (DAO) at 1210 that provides an abstract interface to database 1212, and integration at 1214 with respect to servers (e.g., e-mail servers) at 1216 and Agile lifecycle management tools at 1218. In this regard, for the user request 1204, the project implementation framework as disclosed herein may be planned in a hyper effective and agile manner based on implementation of artificial intelligence at 1220. The artificial intelligence at 1220 may include the processes of obtaining relevant data, processing the data, training an artificial intelligence model, testing of the model, prediction of results, and modification of the artificial intelligence model.

Operation of the apparatus 100 is described in further detail with reference to FIGS. 1-14.

Referring to FIGS. 1 and 2, as disclosed herein, the readiness predictor 102 may allow a project team to self-evaluate their viability for utilizing the project implementation framework for a specified way of working by reducing dependency on personnel (e.g., a coach). The readiness predictor 102 may consider three dimensions of realignment (e.g., scope, team, and mindset), and may provide a specified technique of assessing a team's readiness for utilization of the project implementation framework. In this regard, as disclosed in further detail with respect to FIGS. 13 and 14, the readiness predictor may facilitate identification of a project team that may utilize the project implementation framework, for example, by determining a return on investment. The readiness predictor 102 may also facilitate utilization of the project implementation framework by implementing consistency with a self-evaluation function, and determination of the return on investment. With respect to return on investment prediction, as disclosed in further detail with respect to FIGS. 13 and 14, the readiness predictor 102 may utilize predictive analytics by extracting information and exploring patterns found in historic data (e.g., past projects), and utilizing the information and patterns to predict trends and behavior patterns of measure and metrics in project teams.

Figure 13:
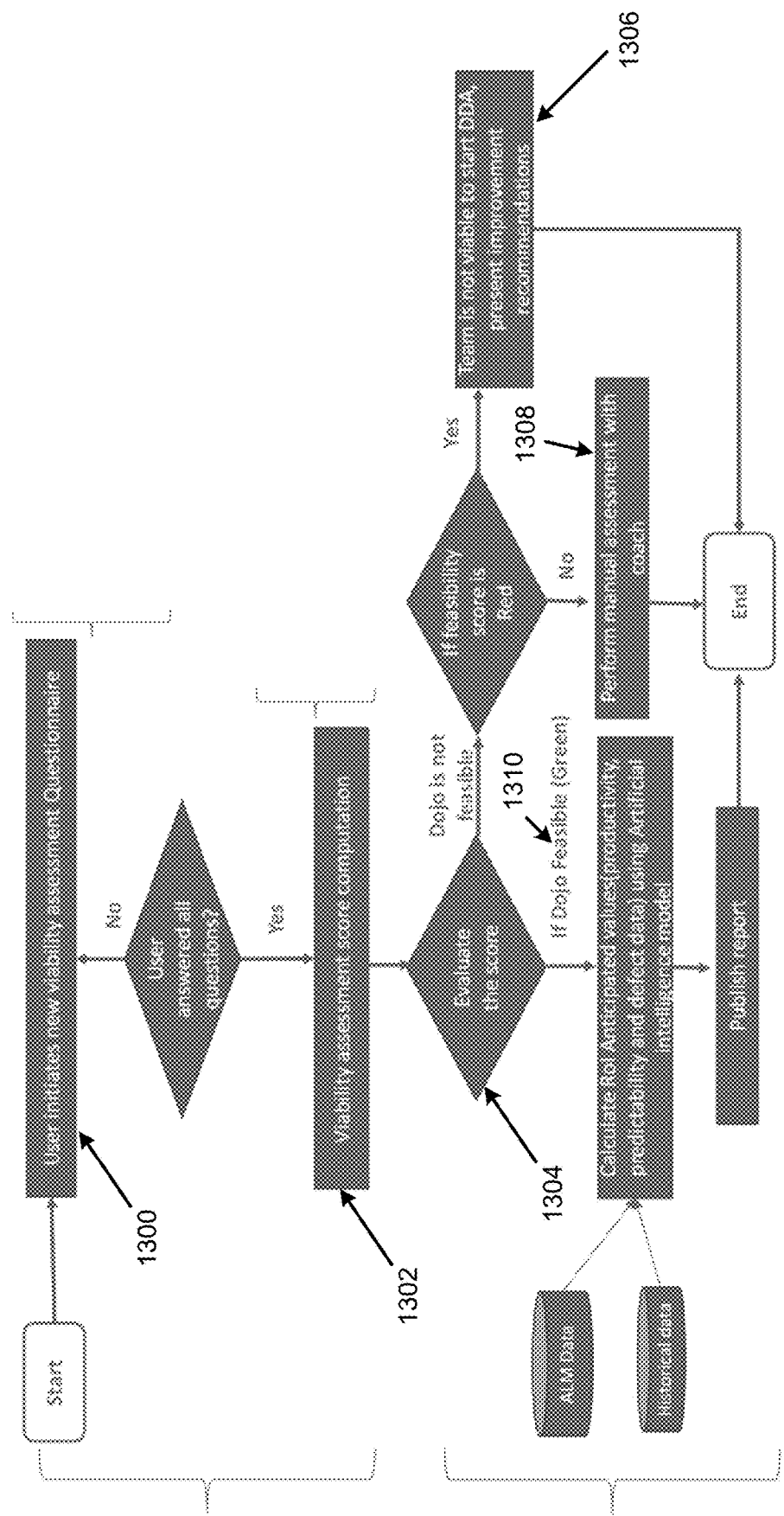
FIG. 13 illustrates a process flow associated with the readiness predictor of the artificial intelligence based project implementation apparatus of FIG. 1 in accordance with an example of the present disclosure.
Figure 14:
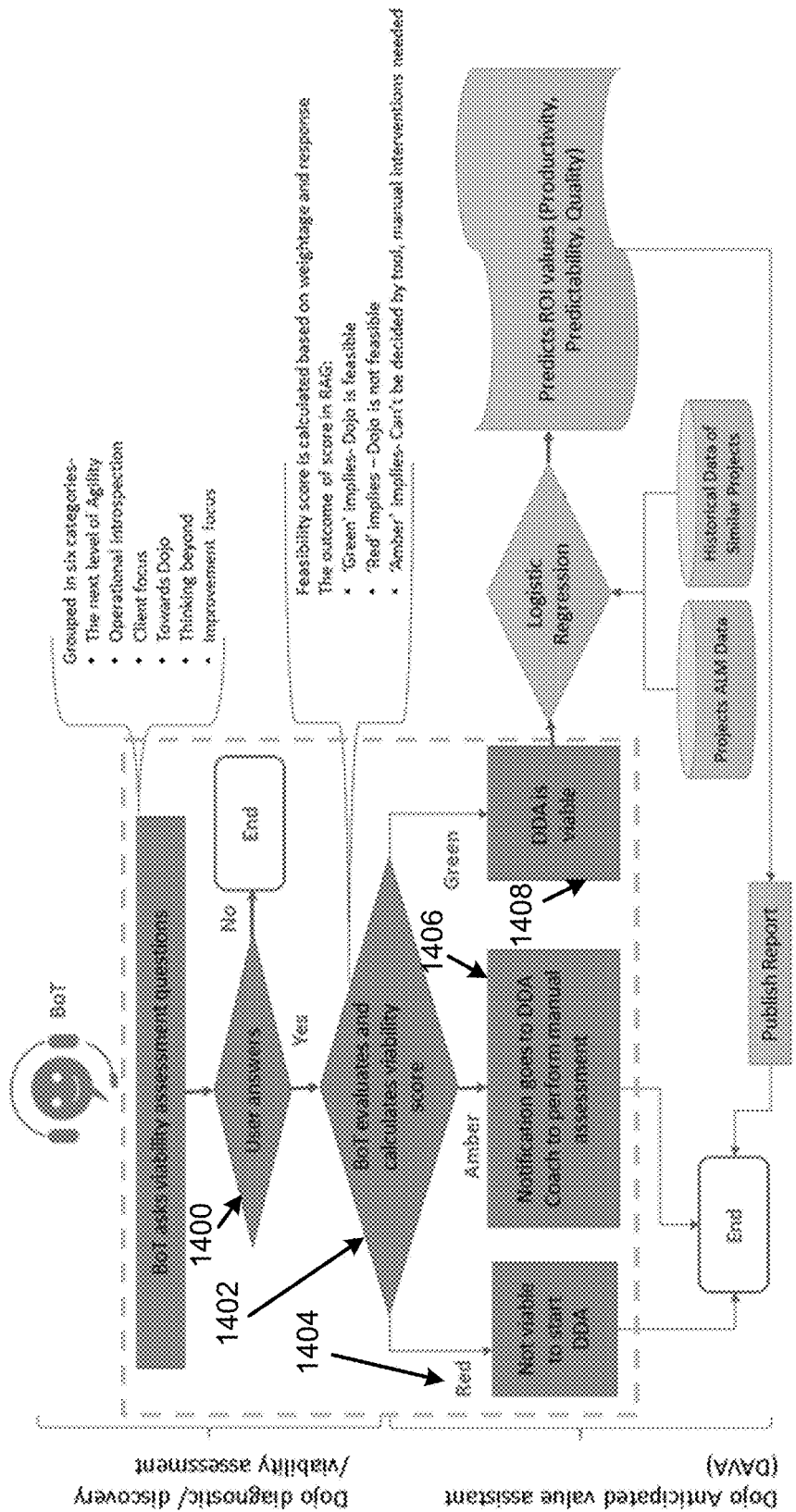
FIG. 14 illustrates a logical flow associated with the readiness predictor of the artificial intelligence based project implementation apparatus of FIG. 1 in accordance with an example of the present disclosure.

The readiness predictor 102, as disclosed in further detail with respect to FIGS. 13 and 14, may identify project teams that are fit for utilizing the project implementation framework. The readiness predictor 102 may provide for sharing of insights on predicted return on investment (e.g., with respect to improved productivity, predictability, and early identification of defects), even before adaptation of the project implementation framework by a project team.

The readiness predictor 102 may represent a smart digital assistant that provides self-assessment ability to project teams. The readiness predictor 102 may provide an adaptability report, as well as details on an expected return on investment in terms of anticipated values.

The readiness predictor 102 may provide for identification of project teams, via a questionnaire, that are fit for adopting the project implementation framework. The questionnaire may be grouped into six categories that include "The next level of Agility", "Operational introspection", "Client focus", "Towards Dojo", "Thinking beyond", and "Improvement focus". The readiness predictor 102 may facilitate sharing of insights on anticipated return-on-investment (in terms of improved productivity, predictability and early identification of defects) even before adopting the project implementation framework. The readiness predictor 102 may apply predictive analysis for predicting values, and referencing historic trends collected from various teams. The readiness predictor 102 may select input of a team's current relevant measures and metrics data from an Agile lifecycle management (ALM) tool. The input may represent historic data which is collected and analyzed from various other teams in a same domain and similar nature of work, and the data may be utilized to grow a self-learning artificial intelligence model.

With respect to a logical flow of operation of the readiness predictor 102, at the outset, the readiness predictor 102 may receive a diagnostic input by project.

Thereafter, the readiness predictor 102 may perform a diagnostic assessment by utilizing a diagnostic assessment analyzer. The diagnostic assessment may provide for assessing of a current state and fitment of a project team. With respect to assessment of viability, there may be multiple questions from different areas such as a team's practices (e.g., Agile practices), operations introspection, client focus, improvement focus, etc. Each question may include associated answer options, where each option represents a level of specific maturity. A team may choose a most appropriate answer (or answers) for each question, and submit an assessment. The diagnostic assessment, as disclosed in further detail with respect to FIGS. 13 and 14, may be performed by a diagnostic assessment analyzer that evaluates each answer option based on a predefined weightage associated with respective a combination of question and answer choice. An outcome of this assessment may indicate the readiness of a team to adopt utilization of the project implementation framework with depictions such as green, amber, and red. As described with respect to FIGS. 13 and 14, outcomes may be determined based on viability outcome assessment based on green, amber, and red status, where 'green' implies project is feasible, 'red' implies project is not feasible, and 'amber' implies that a decision cannot be made and manual intervention is needed. For example, a green status may mean that adoption with respect to the project implementation framework is feasible. An amber status may mean that some adjustments may be needed for adoption with respect to the project implementation framework. Further, a red status may mean that adoption with respect to the project implementation framework is not feasible. If the readiness report indicates an amber or red status, the diagnostic assessment analyzer may provide suggested improvements and/or changes for adoption of the project implementation framework. As described herein with reference to FIGS. 13 and 14, with respect to determination of improvements, every question may be accompanied with improvement recommendations which are shared when computation is assessed as 'red'.

Next, based on a positive (e.g., yes) diagnostic assessment, further processing may proceed to an anticipated value assistant. The anticipated value assistant may receive data such as Agile lifecycle management data, and historic data. The anticipated value assistant may anticipate a value a team may achieve by implementing the project implementation framework. As disclosed herein with respect to FIG. 14, with respect to the anticipation performed by the anticipated value assistant, the return on investment anticipated values (e.g., productivity, predictability, and defect data) may be determined using an artificial intelligence model (e.g., a logistics regression model). The value may help determine whether an organization is investing in a right team and at the right time. Once a team is qualified as fit for adopting the project implementation framework, the anticipated value assistant may provide more insight on challenges and values a team may want to achieve. For example, based on a current team's data from an Agile lifecycle management tool, the anticipated value assistant may anticipate values such as a team's predictability, productivity, time-to-market, cycle time, early identification of defects, etc. The Agile lifecycle management tool may help teams manage their requirements, issues, and tests. As disclosed herein with respect to FIG. 14, the values anticipated by the anticipated value assistant may be determined by applying a logistics regression artificial intelligence model on data secured from Agile lifecycle management (ALM) data. The anticipated value assistant may apply predictive analytics for predicting values, and may reference historic trends collected from various teams.

Thus, the anticipated value assistant may represent an artificial intelligence engine that takes input of a team's current relevant measures and metrics data from an Agile lifecycle management tool. The historic data may be collected and analyzed from various other teams in a same domain, and a similar nature of work. This analysis may be utilized to grow a self-learning artificial intelligence model. Based on both inputs that include a team's current relevant measures and metric data, and the historic data, the anticipated value assistant may anticipate values a team may expect by implementation of the project implementation framework.

Next, the readiness predictor 102 may publish a report. In this regard, based on a negative (e.g., no) diagnostic assessment, the readiness predictor 102 may publish the report. The report may include an output from viability, anticipated values, predicted return on investment, and improvement action items.

FIG. 13 illustrates a process flow associated with the readiness predictor 102 in accordance with an example of the present disclosure. FIG. 14 illustrates a logical flow associated with the readiness predictor 102 in accordance with an example of the present disclosure.

Referring to FIGS. 13 and 14, the readiness predictor 102 may implement, for the project team 120, self-evaluation (e.g., at 1300 of FIG. 13 and 1400 of FIG. 14) of viability for utilizing the project implementation framework 122 by determining, based on responses to a plurality of inquiries associated with the project implementation framework 122, a viability score (e.g., at 1302 and 1402). Based on a determination (e.g., at 1304 and 1402) that the viability score is less than a specified first viability threshold, the readiness predictor 102 generate an indication (e.g., at 1306 and 1404) that the project implementation framework 122 is not viable to be utilized by the project team 120. Based on a determination (e.g., at 1308 and 1406) at that the viability score is between the specified first viability threshold and a specified second viability threshold, the readiness predictor 102 may generate an indication for further evaluation of viability of the project implementation framework 122 to be utilized by the project team 120. Based on a determination (e.g., at 1310 and 1408) that the viability score is greater than the specified second viability threshold, the readiness predictor 102 may generate an indication that the project implementation framework 122 is viable to be utilized by the project team 120.

Referring again to FIGS. 1 and 2, the readiness predictor 102 may allow project teams to self-evaluate their viability for adopting the project implementation framework. The readiness predictor 102 may consider three dimensions of realignment (scope, team, and mindset). The readiness predictor 102 may facilitate adoption of the project implementation framework by implementing consistency with a self-evaluation mechanism and anticipating return on investment. The readiness predictor 102 may provide project diagnostic, discovery, and viability assessment to identify project teams, via a questionnaire, that are fit for adopting the project implementation framework. The questionnaire may be grouped in six categories that include "The next level of Agility", "Operational introspection", "Client focus", "Towards Dojo", "Thinking beyond", "Improvement focus". Examples of questions from the six categories may include "Do you practice agile delivery for RUN work and minor change work? (Yes/No/Not Applicable)," "Do you feel that current delivery iterations are long? (Yes/No/Not Applicable)", "Does the client need to reduce cost of quality? (Yes/No/Not Applicable)", etc. The readiness predictor 102 may facilitate sharing of the insights on anticipated return on investment (in terms of improved productivity, predictability and early identification of defects) even before adopting the project implementation framework. A project manager may decide "Are we investing on right teams at right time?". The readiness predictor 102 may apply predictive analysis for predicting values, referencing historic trends collected from various teams. The readiness predictor 102 may select input of a team's current relevant measures and metrics data from an Agile lifecycle management tool. The readiness predictor 102 may analyze historic data which is collected and analyzed from various other teams in the same domain and similar nature of work.

Referring to FIGS. 1 and 2, as disclosed herein, the digital coach 104 may represent a smart conversational and interactive BOT. The digital coach 104 may facilitate utilization of the project implementation framework by a project team. A project team may interact with the digital coach 104 to clarify queries related to the project implementation framework. In this regard, the digital coach 104 may facilitate utilization of the project implementation framework, and orchestration of the flow of the project implementation framework. The digital coach 104 may be speech based to assist a team in providing a platform for understanding the project implementation framework. The digital coach 104 may provide assistance on a process flow by utilizing verbal, text, and messaging communication channels, and create a personalized experience for users.

As disclosed herein with respect to FIGS. 3 and 4, the digital coach 104 may generate detailed guidance with respect to real-time challenges to improve a project's maturity level. The digital coach 104 may be utilized in an online or an offline mode. The digital coach may guide team members on a logical flow associated with the project implementation framework, and may orchestrate the logical flow based on timelines and process flow to facilitate adoption of the project implementation framework. The digital coach 104 may utilize a hybrid approach for selecting solutions to coach teams from different domains. The digital coach 104 may include a conversational path that is crafted based on domain inputs. The digital coach 104 may provide flexibility to users, where users may enter queries according to their interests, or may select text or talk to communicate with a BOT of the digital coach 104 through voice messages.

The digital coach 104 may represent a smart digital platform that coaches the team both online and offline at their own pace. With respect to online support, when a team is relatively new for adoption of the project implementation framework, they may have several queries on the process. A smart BOT of the digital coach 104 may provide assistance to the team in clarifying all their queries on which the BOT is trained. With respect to offline support, the project implementation framework may enable a team to unlock a next level of Agility. In this regard, during initial stages of adoption of the project implementation framework, a team may need practical guidance to handle different situations to move to the next level Agility. In such scenarios, as disclosed herein with respect to FIGS. 3 and 4, the digital coach 104 may provide the team a detailed and practical solution. The digital coach 104 may also provide a team the flexibility to download the detailed solution and use the solution offline at their convenience. Furthermore, in order to coach teams on the project implementation framework, the digital coach 104 may be trained with frequently asked questions and practical guidance. In this regard, queries which cannot be answered by the BOT of the digital coach 104 may be redirected to appropriate personnel.

Referring again to FIGS. 1 and 2, as disclosed herein, the digital canvas 106 may facilitate documentation of all discussions in a digital format during envisioning, and maintain the documented information for reference at any time during execution of the project implementation framework. In this regard, for envisioning, such as Squad Envisioning, it is technically challenged to record information during such envisioning since all of the decisions may be based on a team's consent. Squad envisioning may represent a ceremony in the project implementation framework. For example, the project implementation framework may begin with Squad envisioning and a primary goal for this session may include defining a purpose pitch, visualizing work, identifying learning goals, discovering impediments, calling out risks, understanding the purpose of the minimum viable product (MVP), and defining a social contract. An outcome of Squad envisioning may include MVP identification, and a groomed backlog with requirements.

The digital canvas 106 may provide for capturing of discussions during envisioning. The digital canvas 106 may provide for capturing of information that may be scattered across different places, such as, Agile lifecycle management (ALM) tools, physical boards, emails, pictures, local systems, etc. ALM may represent product lifecycle management (governance, development, and maintenance) of computer programs developed using Agile methodology. Tools such as Jira etc. may represent an example of Agile ALM.

The digital canvas 106 may thus provide for documentation of all discussions in a digital format during envisioning, such as Squad envisioning, and maintenance of this information on a real-time basis for reference at any time during execution of the project implementation framework. The digital canvas 106 may also provide for transparency and reliability with respect to up-to-date information that may be needed. The digital canvas 106 may reduce the dependency on personnel to obtain the latest information while making decisions during execution of the project implementation framework.

The digital canvas 106 may provide a single source of information related to operation of the project implementation framework. In this regard, the digital canvas 106 may assist in maintaining a standard and structured approach across all executions of the project implementation framework, for example, during Squad envisioning.

The digital canvas 106 may also be maintained as a real-time document which may be updated and referenced at any time during execution of the project implementation framework. For example, an artificial intelligence engine of the digital canvas 106 may ensure that the digital canvas 106 is always in sync with an Agile lifecycle management tool.

The digital canvas 106 may also provide for conversion of scanned images and pictures into information. In this regard, the digital canvas 106 may utilize, for example, optical character recognition technology, and other such technologies.

The digital canvas 106 may be visible to all team members and other personnel that may be working at remote locations.

The digital canvas 106 may represent a single place for reference of overall information of a team. The digital canvas 106 may represent a real-time document that may be updated during a journey associated with operation of the project implementation framework. The digital canvas 106 may include three focus areas that include value preposition, resources and activities, and a plan for learning and delivery goals.

With respect to value preposition, the digital canvas 106 may include value preposition information related to problems and challenges that may be faced by a team, or any improvisation desired. The digital canvas 106 may further include value preposition information related to a purpose pitch that represents an objective or goal of a cycle associated with the project implementation framework (e.g., approximately 4 to 8 weeks). The purpose pitch may help a team with a common understanding of "why we are doing and what we are doing?". The digital canvas 106 may further include value preposition information related to systems and applications that are impacted. The systems and applications may be upstream or downstream systems. The information related to the systems and applications may facilitate the defining of a scope of boundaries of a specific squad. The information related to systems and applications may also be utilized for identifying and estimating impact and dependencies. The digital canvas 106 may also include value preposition information related to risk and impediments. In this regard, the information may include known risks, impediments, and a mitigation plan identified by a team during an envisioning event. The digital canvas 106 may further include value preposition information related to values. In this regard, the values may include mutually agreed values from appropriate personnel and a team, where the team may want to enhance such values during a journey associated with the project implementation framework. The values may facilitate the measurement of outcomes post implementation of the project implementation framework. The digital canvas 106 may further include value preposition information related to current key performance indicators (KPIs). The current KPIs may provide a baseline with respect to the outcome measuring parameters (e.g., before starting). The current KPIs may help teams to introspect on progress, and taking of appropriate actions to pivot if the progress is not acceptable.

With respect to resources and activities, the digital canvas 106 may include information related to resources and activities to be performed as part of an operation of the project implementation framework. The resources and activities may include information related to key partners that may represent specified personnel that support a journey associated with operation of the project implementation framework. The resources and activities may further include Squad members that represent information about planned team realignment for the project implementation framework. In this regard, a Squad size may be less than or equal to five members. The resources and activities may further include a configuration of the project implementation framework that represents process, activities and a timeline that is agreed before starting a journey associated with the project implementation framework. The resources and activities may further include a social contract that is created and to be honored by a team during a journey associated with the project implementation framework on a day to day basis.

With respect to a plan for learning and delivery goals, the digital canvas 106 may include learning goals that are aligned with values, practices and accelerating upcoming delivery goals. The learning goals may enable team members in acquiring E-shape skills. With respect to E-shape skills, E-shaped people may include people that "execute", where such people may include a combination experience, expertise, exploration, and execution. The plan for delivery goals may include a hyper-sprint wise breakup of delivery goals aligned with a planned minimum viable product.

Referring again to FIGS. 1 and 2, the digital canvas 106 may facilitate the conversion of information into a digital format. Some of the characteristics for this may include creating the digital format to store the values of each field, where a team may type-in each field in the digital canvas 106, using optical character recognition, a user may click a picture of a physical board and upload, and a team may edit any field (except static fields such as current KPI values may not be changed, purpose pitch, and a configuration of the project implementation framework). Other characteristics may include using an artificial intelligence engine, the digital canvas 106 may sync with an Agile lifecycle management tool to provide the latest data, intelligent information radiators may provide for the customization of the view of digital canvas dashboard, based on respective needs, and a detailed report may be downloaded in multiple formats. With respect to radiators, an information radiator in Agile, also known as a Big Visible Chart (BVC), may include a large graphical representation of project information maintained in sight within an Agile development team's shared workspace.

Referring to FIGS. 1 and 2, as disclosed herein, the smart assistant 108 may provide for implementation of specified techniques, such as a SHEQC technique, of dividing requirements with artificial intelligence capabilities. In this regard, a team may analyze complex requirements to produce a demonstration for generating feedback, and triggering the correct conversations in a specified time duration (e.g., a hyper sprint of 2.5 days).

With respect to the smart assistant 108, requirements may not be groomed granularly enough to produce working software at frequent intervals for feedback. Moreover, requirements and features may be relatively complicated with missing clarity on execution. These factors may result in delays with respect to a project delivery timeline. In this regard, a hyper sprint demonstration every 2.5 days (or another specified time duration) may act as a constructive constraint that requires dividing (e.g., slicing) of complex requirements in smaller stories scenarios.

The smart assistant 108 may slice requirements, for example based on a SHEQC technique of dividing requirements, with artificial intelligence capabilities that enables teams to groom complex requirements to produce a demonstration for generating feedback, and for triggering the correct conversations during every hyper sprint of 2.5 days. In this regard, as disclosed herein with respect to FIG. 5, with respect to dividing of requirements, participants may be advised to refine a given story based on SHEQC scenarios (Sad, Happy, Exception, Quality and Constraint). The dividing of requirements into scenarios may help to build in ultra-focus. The smart assistant 108 may provide for the identification and prediction of key impediments or lean waste in a flow of work. With respect to lean waste, under a lean system, seven wastes may be identified as overproduction, inventory, motion, defects, over-processing, waiting, and transport. Any of these wastes impacting productivity of a team may need to be identified and eradicated as quickly as possible. The smart assistant 108 may generate a conversation path that is planned on an ideation process, and is ideal for teams operating in hyper sprint mode due to a shorter duration and focused approach.

The smart assistant 108 may forward and obtain work from Agile lifecycle management tools, and utilize speech recognition to reduce redundant efforts of documenting the grooming discussions on Agile lifecycle management tools, and ordering the scenarios and requirements. The smart assistant may further provide for validation of requirements through rules, such as an INVEST rule, to ensure that acceptance criteria also includes clarity of execution and dependency. In Agile software projects, INVEST may be referred as characteristics of a good quality product backlog Item. For example, for INVEST, I may represent independent, where a product backlog item should be self-contained in a way that there is no inherent dependency on another product backlog item, N may represent negotiable, where product backlog items are not explicit contracts and should leave space for discussion, V may represent valuable, where a product backlog item may need to deliver value, E may represent estimable, where a size of the product backlog item may need to be estimated, S may represent small, where product backlog items may not be so big as to become impossible to plan/task/prioritize within a level of accuracy, and T may represent testable, where the product backlog item or its related description may need to provide the necessary information to make test development possible.

The smart assistant 108 may provide for improvement of code, by capturing quality and technical constraints scenarios in tools. The smart assistant 108 may reduce backlog grooming discussions, as well as a frequency of such discussions to ensure active participation.

The smart assistant 108 may be voice activated and include programmed responses for scenario capturing, such as SHEQC scenario capturing. The smart assistant 108 may facilitate the sensing of scenarios, as well as classification of areas. The smart assistant 108 may utilize natural language processing and wizard technology for creating optimal solutions for teams.

The smart assistant 108 may be utilized, for example, during backlog refinement discussions by teams that utilize the project implementation framework to slice requirements in stories and scenarios. The smart assistant 108 may obtain requirements from the agile lifecycle management tool. The smart assistant 108 may capture scenarios based on categories that include sad, happy, exceptional, quality, and constraints. The smart assistant 108 may include screens that are designed to capture discussions and/or notes by appropriate personnel and team members.

After saving a conversation, the smart assistant 108 may organize the captured scenarios based on priority. The scenarios may be prioritized to help a team understand the most important scenarios to be delivered in a requirement.

The smart assistant 108 may validate created scenarios for readiness by using, for example, and INVEST rule, to ensure high-quality of an acceptance criteria for each scenario created. In this regard, the smart assistant 108 may generate suggestions with respect to the scenarios in the event of any discrepancies.

The smart assistant 108 may provide an option to align multiple scenarios in a requirement to provide appropriate values. The smart assistant 108 may provide flexibility to create a requirement/task from a scenario, or may bundle the scenarios. Once a team has created and prioritized all scenarios, the smart assistant 108 may forward these scenarios back to the Agile lifecycle management tool to ensure association with a requirement and epic is maintained along with privatization.

Referring again to FIGS. 1 and 2, as disclosed herein, the intelligent value and learning assistant 110 may represent a smart tool that enables creative problem-solving techniques to design a value board that creates visibility as to why a learning goal is chosen and what a team will achieve. With respect to the intelligent value and learning assistant 110, the project implementation framework may include a combination of learning and delivery goals. In this regard, it is technically challenging to discover and quantify the learning goals of teams.

The intelligent value and learning assistant 110 may represent an intelligent tool that provides for the defining and monitoring of learning goals that are rooted to values. In this regard, as disclosed herein with respect to FIG. 6, by using a pairwise ranking model, all values/KPIs/challenges, and learning goal pairs may be labeled to identify the correct match. Thereafter, associated learning goals may be predicted based on the outcome of the model, and suggested to the user. The values may be in the dimensions of cost, speed, quality and/or happiness. The intelligent value and learning assistant 110 may provide for identification of these values, which may facilitate continuous learning for teams. In this regard, by extracting information and patterns found in historic data (e.g., of past projects) and using the extracted information and patterns to predict learning goals for teams, the intelligent value and learning assistant 110 may reduce time, effort, and dependency on personnel for identifying learning goals which are rooted to values and relevant for teams for improving technical agility. The intelligent value and learning assistant 110 may also utilize E-shaped skills that a team has acquired, to help teams to have transparency on skill metrics.

The intelligent value and learning assistant 110 may enable creative problem-solving techniques for the design of a value board to create visibility as to why certain learning goals are chosen, and what values a team may achieve. The learning goals may be monitored by setting baselines, establishing tracking mechanisms, reviewing and adjusting the same, and publishing reports for measuring the same. The intelligent value and learning assistant 110 may provide recommendations to adopt specific learning goals based on a team's top challenges. The intelligent value and learning assistant 110 may utilize historic data to provide recommendations which reduce the time and effort of teams and other personnel that may utilize the project implementation framework. Thus, teams may acquire E-shaped skills which are monitored, radiated, and published.

The intelligent value and learning assistant 110 may utilize voice recognition and artificial intelligence to help teams determine relevant learning goals. In this regard, the intelligent value and learning assistant 110 may issue alerts, prescribe next steps, and suggest ways to optimize processes.

The intelligent value and learning assistant 110 may provide assistance to team members with respect to learning of new skills based on the values team members want to reflect as a team, and move towards acquiring E-shaped skills.

The intelligent value and learning assistant 110 may provide guidance for teams to draft their value driven goals by providing a guided framework for designing a value board, and providing editable learning goals and timelines associated with the editable learning goals for each value that a team wants to reflect. Further, the intelligent value and learning assistant 110 may utilize a label option of an Agile lifecycle management tool to query data for tracking progress.

Referring again to FIGS. 1 and 2, as disclosed herein, the social contract analyzer 112 may represent an intelligent mechanism that may evaluate the honoring of a social contract, and raise impediments if the social contract is not honored for specified occurrences of social contract requirements. The social contract analyzer 112 may provide for the implementation of appropriate actions by a team to facilitate self-organization by the team. In this regard, teams may not be able to become self-organized by only defining the social contract and working guidelines among them. The social contract analyzer 112 may evaluate a team's participation in events associated with the project implementation framework, which may generate a sense of commitment within a team to make the team more self-organized. The social contract analyzer 112 may also provide for identification of missing participants in an event associated with the project implementation framework.

The social contract analyzer 112 may include integrated analytical intelligent capabilities to generate a cumulative pattern for all occurrences of events (e.g., a ceremony) associated with the project implementation framework, thereby providing a means to take corrective measures against predicted anti-patterns. With respect to anti-patterns, an anti-pattern may include a common response to a recurring problem that is usually ineffective and risks being highly counterproductive. The social contract analyzer 112 may notify a team when there is more than a specified occurrence of a social contract requirement not being honored (e.g., not participating in an event (such as a ceremony) associated with operation of the project implementation framework). The social contract analyzer 112 may generate such cumulative pattern for all ceremonies, publish a consolidated report for each hyper sprint, and forward the report to appropriate personnel.

The social contract analyzer 112 may provide an intelligent mechanism to evaluate the honoring of a social contract, and raise impediments if the social contract is not honored for specified occurrences of social contract requirements. As disclosed herein with respect to FIG. 7, with respect to evaluation of a social contract, and identification of impediments, under agile management, social contracts may be put in place by teams to define the way that a particular team chooses to work. Thus, a social contract may represent an agreement between the team members that enables them to self-organize and be effective. The social contract analyzer 112 may does provide for a team to take appropriate actions, and become more self-organizing. Furthermore, the social contract analyzer 112 may utilize a predictive modeling tool to predict social behavior before the occurrence thereof, and may also generate preventative measures that may be taken.

The social contract analyzer 112 may consolidate, based on a list of participants with respect to the project implementation framework, participant details for all previous occurrences of a ceremony, and generate a cumulative pattern. The social contract analyzer 112 may generate the cumulative pattern for all ceremonies of a hyper sprint. The social contract analyzer 112 may create an impediment in the Agile lifecycle management tool in case there is more than a specified occurrence of a social contract requirement not being honored. These aspects may provide for the undertaking of corrective measures against emerging Antipatterns. At the end of every hyper sprint, the social contract analyzer 112 may generate a consolidated report.

With respect to the social contract analyzer 112, after an end of a ceremony, the social contract analyzer 112 may ascertain a participant list.

Thereafter, the social contract analyzer 112 may generate a cumulative pattern of all previous occurrences of that ceremony.

Thereafter, the social contract analyzer 112 may determine whether a number of occurrences of a dishonored social contract is greater than N.

Based on a determination that the number of occurrences of a dishonored social contract is greater than N, the social contract analyzer 112 may create an impediment in the agile lifecycle management tool.

Based on a determination that the number of occurrences of the dishonored social contract is less than N, the social contract analyzer 112 may determine whether the hyper sprint is closed.

Based on a determination that the hyper sprint is closed, the social contract analyzer 112 may share a consolidated report of cumulative patterns of all ceremonies.

Referring again to FIGS. 1 and 2, as disclosed herein, the impediment remediator 114 may analyze, predict, and remediate impediments. In this regard, as disclosed herein with respect to FIGS. 8 and 9, the impediment remediator 114 may remediate impediments, and/or forward impediments to appropriate personnel for remediation. With respect to the impediment remediator 114, a team may not include a strong drive to discover impediments, and address the impediments at hyper speed. For example, an average age of resolving impediments or a mean time to resolve impediments (MTTR) may be relatively high, which diminishes the pace of work associated with the project implementation framework, where a hyper sprint demo cycle may be specified at 2.5 days. The impediment remediator 114 may investigate, predict, and remediate impediments in this regard. The impediment remediator 114 may include an escalation process to expedite impediments to appropriate personnel. In this regard, by placing focus on impediments, a team may improve their MTTR and time to market (TTM) for a product.

As disclosed herein with respect to FIG. 9, the impediment remediator 114 may provide for a team to discover impediments that may cause delays, for example, in producing working software early in an iteration. For example, with respect to the impediment remediator 114, impediment resolution may be improved based, for example, on impediment boards (for visualizing impediments), daily evaluations of impediments, and role of key personnel. An impediment may be escalated, and thereby addressed by appropriate personnel. In this regard, alerts, emails, and radiators may keep teams and appropriate personnel updated and focused for the required attention needed to resolve impediments. The impediment remediator 114 may thus ensure the required intelligence needed for sending customized context specific alerts, emails, and messages based on criticality and impact of an impediment.

The impediment remediator 114 may facilitate the understanding of impediments based on the utilization of descriptive analytics (e.g., what is happening) through Agile lifecycle management tools, diagnostic analytics (e.g., why is it happening) through data patterns of past projects, and help teams in predictive analytics (e.g., what will happen) to identify the impact of an impediment on a specified outcome (e.g., as disclosed herein with respect to FIGS. 8 and 9). The impediment remediator 114 may also provide guidance based on prescriptive analysis to facilitate with an understanding of how to control or minimize the impact of an impediment without disrupting the minimum viable product (MVP) timelines and commitments.

For the impediment remediator 114, impediments may be logged and maintained in the Agile lifecycle management tool with ownership, timelines, and dependency. Utilizing this data, impediments may be radiated, for example, as red, green, and amber, using a rule-based engine that is dependent on timelines and criticality. An impediment may be escalated to appropriate personnel through a chatbot/email trigger after a defined threshold of time. The impediment remediator 114 may provide an alert system to context level (e.g., individual or team accountability) for follow-ups, resolving impediments and tracking the impediments for closure. The impediment remediator 114 may also start learning from agile lifecycle management patterns, and predict the risk and impediments, while sending alerts for the risk and impediments to help teams to take proactive measures.

With respect to the impediment remediator 114, aspects such as impediments maintained in an Agile lifecycle management tool with timeline and criticality, rule-based turning of red/amber/green, an email trigger for escalating an impediment every 2.5 days to a next level, prediction of impediments based on patterns, and an alert system supported by BOTs for follow-ups and tracking impediments foreclosure, may all be utilized by the impediment remediator 114 to address the impediments at hyper speed.

Referring again to FIGS. 1 and 2, as disclosed herein, the intelligent dashboard implementer 116 may implement an artificial intelligence enabled dashboard to provide visualizations, for example, of required metrics, measures, and impediments. The intelligent dashboard implementer 116 may identify trends with real-time monitoring of relevant applications, and may determine (e.g., predict) an impact of missing targets, and timelines. Based on the confidence scope of matching, similar stories may be identified. If a new story is not matching with any of the completed stories, then it will be treated as a unique story. For all the matching stories, respective impediments, impact logged and solution identified may be fetched. The intelligent dashboard implementer 116 may provide a visualization of required metrics, measures, and impediments, which may be needed for re-planning. In this regard, artificial intelligence analytics may identify trends, and provide correlations in real time by monitoring relevant applications and predicting the impact of missing targets and timelines on overall commitments. The intelligent dashboard implementer 116 may provide a 360° view to allow a team may make better decisions to improve user satisfaction.

The intelligent dashboard implementer 116 may represent an artificial intelligence power dashboard that monitors and interprets data from different sources, and provides meaningful insights. The intelligent dashboard implementer 116 may keep all dashboards (e.g., associated with the digital canvas 106, the intelligent value and learning assistant 110, the social contract analyzer 112, and the impediment remediator 114) synchronized, and as live documents. The intelligent dashboard implementer 116 may issue alerts, generate forecasts, analyze root causes, recommend fixes, prescribe next steps, and suggest ways to optimize processes.

Referring again to FIGS. 1 and 2, as disclosed herein, the improvement pattern generator 118 may represent a smart artificial intelligence powered assistant that facilitates creation of quantitative and qualitative measures for parameters such as productivity, predictability, and happiness index. The improvement pattern generator 118 may generate and evaluate patterns on parameters such as productivity, predictability, E-shaped skills, and a team's happiness index which drives the team toward a successful journey.

The improvement pattern generator 118 may represent a smart artificial intelligence powered assistant that derives parameters such as productivity, and predictability from an Agile lifecycle management tool, and generate a cumulative pattern at the end of every hyper sprint. The improvement pattern generator 118 may capture the inputs from personnel on a team on parameters such as a team's happiness index, and their progress on skills matrices on the new practices (e.g., technical/non-technical). The improvement pattern generator 118 may generate cumulative patterns for parameters such as productivity and predictability, which may not be supported by the Agile lifecycle management tools, and use these parameters to predict trends and behavior patterns, and provide recommendations. The improvement pattern generator 118 may generate metrics that drive the transformation of teams from a T-shaped to an E-shaped skillset. With respect to T-shaped skills, T-shaped persons may represent a metaphor used to describe the abilities of persons in the workforce. The vertical bar on the letter T may represent the depth of related skills and expertise in a single field, whereas the horizontal bar may represent the ability to collaborate across disciplines with experts in other areas and to apply knowledge in areas of expertise other than one's own. With respect to T-shaped versus E-shaped skills, T-shaped skilled people may include deep expertise in one area whereas E-shaped skilled people may include deep expertise in more than one area. For example, T-shaped skilled people may have broad skills across several areas but an E-shaped skilled person may have experience across several areas, have proven execution skills, and may often be in an exploring and innovating stage.

Figure 15:
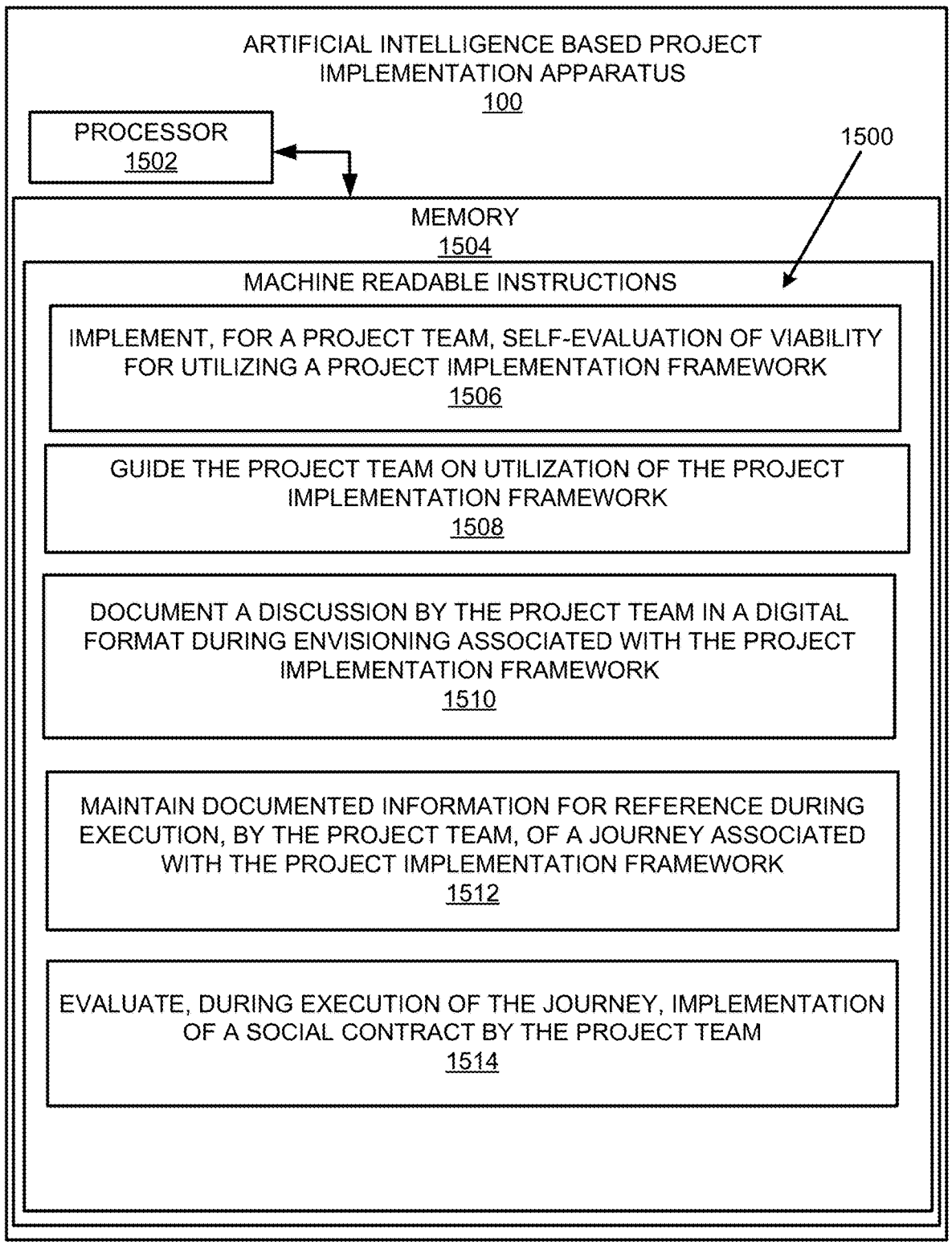
FIG. 15 illustrates an example block diagram for artificial intelligence based project implementation in accordance with an example of the present disclosure.
Figure 15:
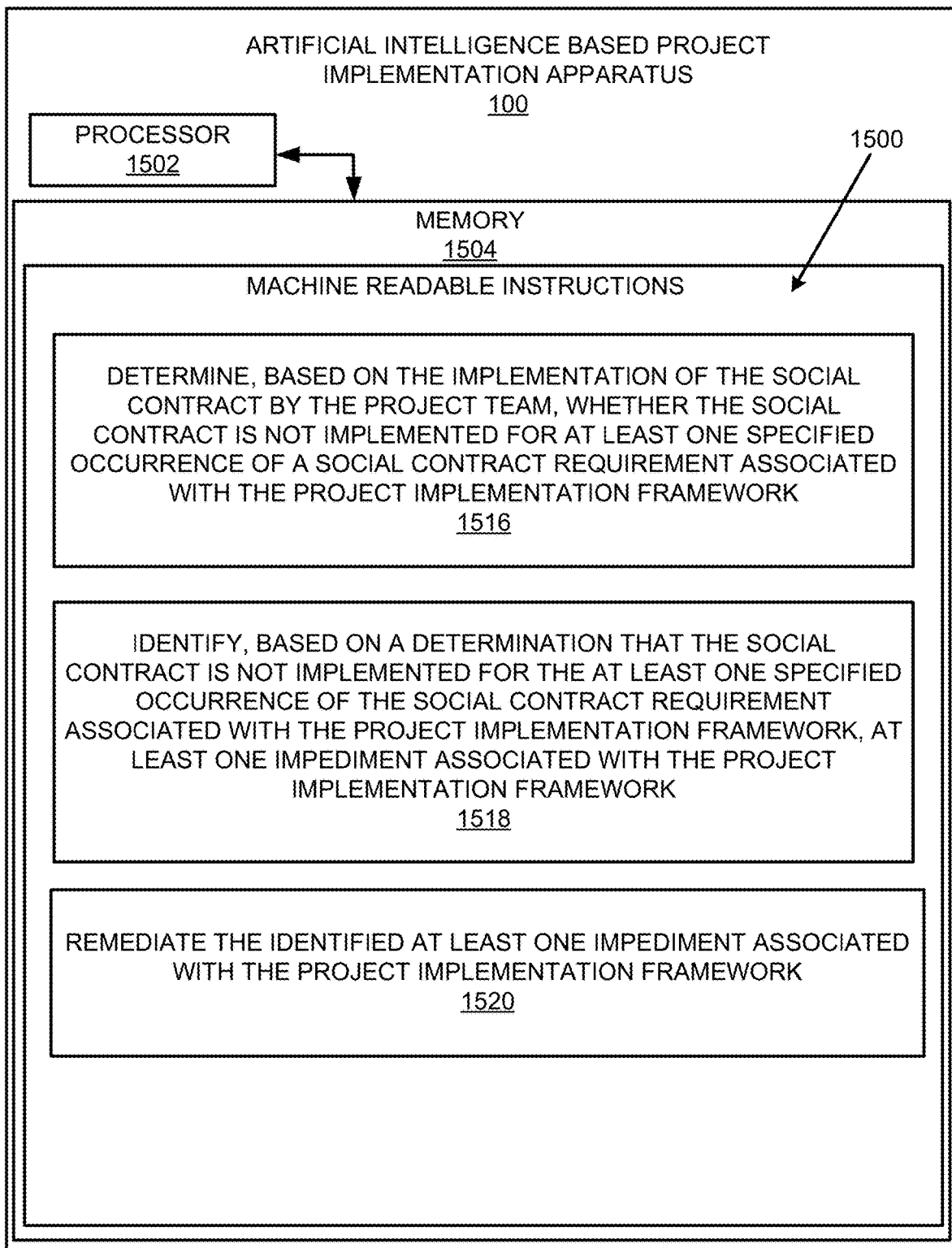
Figure 17:
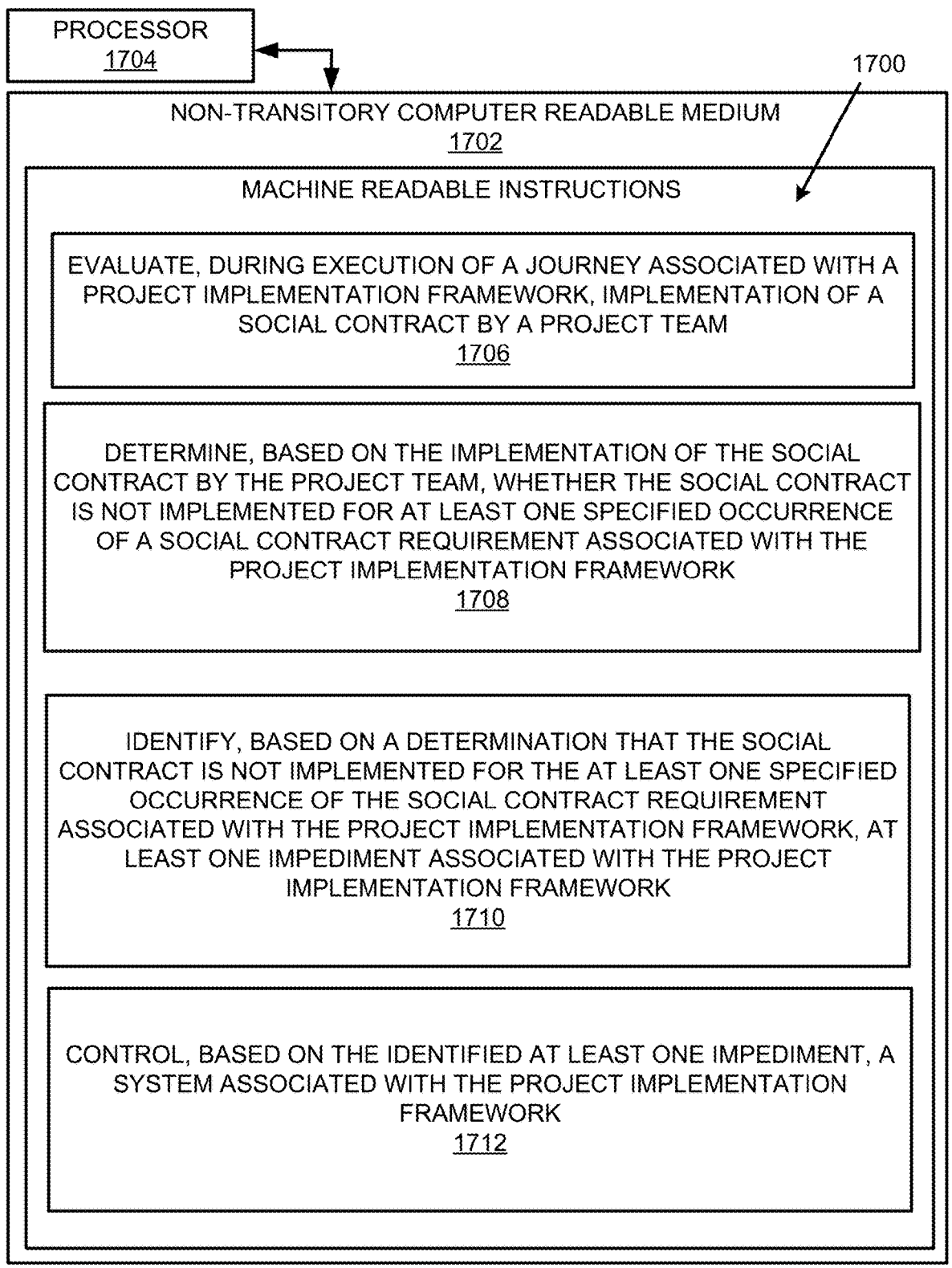
FIG. 17 illustrates a further example block diagram for artificial intelligence based project implementation in accordance with another example of the present disclosure.

FIGS. 15-17 respectively illustrate an example block diagram 1500, a flowchart of an example method 1600, and a further example block diagram 1700 for artificial intelligence based project implementation, according to examples.

The block diagram 1500, the method 1600, and the block diagram 1700 may be implemented on the apparatus 100 described above with reference to FIG. 1 by way of example and not of limitation. The block diagram 1500, the method 1600, and the block diagram 1700 may be practiced in other apparatus. In addition to showing the block diagram 1500, FIG. 15 shows hardware of the apparatus 100 that may execute the instructions of the block diagram 1500. The hardware may include a processor 1502, and a memory 1504 storing machine readable instructions that when executed by the processor cause the processor to perform the instructions of the block diagram 1500. The memory 1504 may represent a non-transitory computer readable medium. FIG. 16 may represent an example method for artificial intelligence based project implementation, and the steps of the method. FIG. 17 may represent a non-transitory computer readable medium 1702 having stored thereon machine readable instructions to provide artificial intelligence based project implementation according to an example. The machine readable instructions, when executed, cause a processor 1704 to perform the instructions of the block diagram 1700 also shown in FIG. 17.

The processor 1502 of FIG. 15 and/or the processor 1704 of FIG. 17 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1702 of FIG. 17), such as hardware storage devices (e.g., RAM (random access memory), ROM (read only memory), EPROM (erasable, programmable ROM), EEPROM (electrically erasable, programmable ROM), hard drives, and flash memory). The memory 1504 may include a RAM, where the machine readable instructions and data for a processor may reside during runtime.

Referring to FIGS. 1-15, and particularly to the block diagram 1500 shown in FIG. 15, the memory 1504 may include instructions 1506 to implement, for a project team 120, self-evaluation of viability for utilizing a project implementation framework 122.

The processor 1502 may fetch, decode, and execute the instructions 1508 to guide the project team 120 on utilization of the project implementation framework 122.

The processor 1502 may fetch, decode, and execute the instructions 1510 to document a discussion by the project team 120 in a digital format during envisioning associated with the project implementation framework 122.

The processor 1502 may fetch, decode, and execute the instructions 1512 to maintain documented information for reference during execution, by the project team 120, of a journey associated with the project implementation framework 122.

The processor 1502 may fetch, decode, and execute the instructions 1514 to evaluate, during execution of the journey, implementation of a social contract by the project team 120.

The processor 1502 may fetch, decode, and execute the instructions 1516 to determine, based on the implementation of the social contract by the project team 120, whether the social contract is not implemented for at least one specified occurrence of a social contract requirement associated with the project implementation framework 122.

The processor 1502 may fetch, decode, and execute the instructions 1518 to identify, based on a determination that the social contract is not implemented for the at least one specified occurrence of the social contract requirement associated with the project implementation framework 122, at least one impediment associated with the project implementation framework 122.

The processor 1502 may fetch, decode, and execute the instructions 1520 to remediate the identified at least one impediment 124 associated with the project implementation framework 122.

Referring to FIGS. 1-14 and 16, and particularly FIG. 16, for the method 1600, at block 1602, the method may include implementing, by at least one hardware processor, for a project team 120, self-evaluation of viability for utilizing a project implementation framework 122.

At block 1604, the method may include evaluating, by the at least one hardware processor, based on the viability for utilizing the project implementation framework 122 and during execution of a journey associated with the project implementation framework 122, implementation of a social contract by the project team 120.

At block 1606, the method may include determining, by the at least one hardware processor, based on the implementation of the social contract by the project team 120, whether the social contract is not implemented for at least one specified occurrence of a social contract requirement associated with the project implementation framework 122.

At block 1608, the method may include identifying, by the at least one hardware processor, based on a determination that the social contract is not implemented for the at least one specified occurrence of the social contract requirement associated with the project implementation framework 122, at least one impediment 124 associated with the project implementation framework 122.

Referring to FIGS. 1-14 and 17, and particularly FIG. 17, for the block diagram 1700, the non-transitory computer readable medium 1702 may include instructions 1706 to evaluate, during execution of a journey associated with a project implementation framework 122, implementation of a social contract by a project team 120.

The processor 1704 may fetch, decode, and execute the instructions 1708 to determine, based on the implementation of the social contract by the project team 120, whether the social contract is not implemented for at least one specified occurrence of a social contract requirement associated with the project implementation framework 122.

The processor 1704 may fetch, decode, and execute the instructions 1710 to identify, based on a determination that the social contract is not implemented for the at least one specified occurrence of the social contract requirement associated with the project implementation framework 122, at least one impediment 124 associated with the project implementation framework 122.

The processor 1704 may fetch, decode, and execute the instructions 1712 to control, based on the identified at least one impediment, a system associated with the project implementation framework 122.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An artificial intelligence based project implementation apparatus comprising:
   a readiness predictor, executed by at least one hardware processor, to
      implement, for a project team, self-evaluation of viability for utilizing a project implementation framework by determining whether the project implementation framework is viable to be utilized by the project team;
   a digital coach, executed by the at least one hardware processor, to
      guide, based on the implementation of the self-evaluation of the viability, the project team on utilization of the project implementation framework;
   a digital canvas, executed by the at least one hardware processor, to
      document a discussion by the project team in a digital format during envisioning associated with the project implementation framework, and
      maintain documented information for reference during execution, by the project team, of a journey associated with the project implementation framework;
   a social contract analyzer, executed by the at least one hardware processor, to
      evaluate, during execution of the journey, implementation of a social contract by the project team,
      determine, based on the implementation of the social contract by the project team, whether the social contract is not implemented for at least one specified occurrence of a social contract requirement associated with the project implementation framework, and
      identify, based on a determination that the social contract is not implemented for the at least one specified occurrence of the social contract requirement associated with the project implementation framework, at least one impediment associated with the project implementation framework; and
   an impediment remediator, executed by the at least one hardware processor, to
      remediate the identified at least one impediment associated with the project implementation framework by controlling, based on the identified at least one impediment, a system associated with the project implementation framework.

2. The artificial intelligence based project implementation apparatus according to claim 1, further comprising:
   a smart assistant, executed by the at least one hardware processor, to
      implement a specified technique of dividing requirements associated with the project implementation framework.

3. The artificial intelligence based project implementation apparatus according to claim 1, further comprising:
   an intelligent value and learning assistant, executed by the at least one hardware processor, to
      implement at least one problem-solving technique for design of a value board associated with the project implementation framework; and
      generate at least one learning goal associated with the project implementation framework.

4. The artificial intelligence based project implementation apparatus according to claim 1, further comprising:
   an intelligent dashboard implementer, executed by the at least one hardware processor, to
      implement an artificial intelligence enabled dashboard to provide visualizations of at least one of metrics, measures, or the impediments associated with the project implementation framework.

5. The artificial intelligence based project implementation apparatus according to claim 1, further comprising:
an improvement pattern generator, executed by the at least one hardware processor, to
generate measures for parameters that include at least one of productivity, predictability, or happiness index associated with the project implementation framework.

6. The artificial intelligence based project implementation apparatus according to claim 1, wherein the readiness predictor is executed by the at least one hardware processor to implement, for the project team, self-evaluation of viability for utilizing the project implementation framework by:
determining, based on responses to a plurality of inquiries associated with the project implementation framework, a viability score;
based on a determination that the viability score is less than a specified first viability threshold, generating an indication that the project implementation framework is not viable to be utilized by the project team;
based on a determination that the viability score is between the specified first viability threshold and a specified second viability threshold, generating an indication for further evaluation of viability of the project implementation framework to be utilized by the project team; and
based on a determination that the viability score is greater than the specified second viability threshold, generating an indication that the project implementation framework is viable to be utilized by the project team.

7. The artificial intelligence based project implementation apparatus according to claim 1, wherein the digital coach is executed by the at least one hardware processor to guide the project team on utilization of the project implementation framework by:
specifying processes, activities, and timelines associated with utilization of the project implementation framework.

8. The artificial intelligence based project implementation apparatus according to claim 1, wherein the digital canvas is executed by the at least one hardware processor to document the discussion by the project team in the digital format during envisioning associated with the project implementation framework, and maintain documented information for reference during execution, by the project team, of the journey associated with the project implementation framework by:
documenting, using at least two databases to perform a two-way sync operation, the discussion by the project team in the digital format during envisioning associated with the project implementation framework; and
maintaining, using the at least two databases to perform the two-way sync operation, the documented information for reference during execution, by the project team, of the journey associated with the project implementation framework.

9. The artificial intelligence based project implementation apparatus according to claim 1, wherein the social contract analyzer is executed by the at least one hardware processor to evaluate, during execution of the journey, implementation of the social contract by the project team, determine, based on the implementation of the social contract by the project team, whether the social contract is not implemented for at least one specified occurrence of the social contract requirement associated with the project implementation framework, and identify, based on the determination that the social contract is not implemented for the at least one specified occurrence of the social contract requirement associated with the project implementation framework, the at least one impediment associated with the project implementation framework by:
determining whether a number of occurrences of a dishonored social contract is greater than a specified social contract threshold; and
based on a determination that the number of occurrences of the dishonored social contract is greater than the specified social contract threshold, generating the at least one impediment associated with the project implementation framework.

10. The artificial intelligence based project implementation apparatus according to claim 1, wherein the impediment remediator is executed by the at least one hardware processor to remediate the identified at least one impediment associated with the project implementation framework by:
identifying, based on a confidence level analysis associated with the project implementation framework, similar stories;
identifying, from each of the identified similar stories, at least one similar impediment to the identified at least one impediment associated with the project implementation framework and a solution to the at least one similar impediment; and
remediating, based on the identified solution to the at least one similar impediment, the identified at least one impediment associated with the project implementation framework.

11. A method for artificial intelligence based project implementation, the method comprising:
implementing, by at least one hardware processor, for a project team, self-evaluation of viability for utilizing a project implementation framework;
evaluating, by the at least one hardware processor, based on the viability for utilizing the project implementation framework and during execution of a journey associated with the project implementation framework, implementation of a social contract by the project team;
determining, by the at least one hardware processor, based on the implementation of the social contract by the project team, whether the social contract is not implemented for at least one specified occurrence of a social contract requirement associated with the project implementation framework;
identifying, by the at least one hardware processor, based on a determination that the social contract is not implemented for the at least one specified occurrence of the social contract requirement associated with the project implementation framework, at least one impediment associated with the project implementation framework; and
remediating, by the at least one hardware processor, the identified at least one impediment associated with the project implementation framework by controlling, based on the identified at least one impediment, a system associated with the project implementation framework.

12. The method according to claim 11, wherein implementing, by the at least one hardware processor, for the project team, self-evaluation of viability for utilizing the project implementation framework further comprises:
determining, by the at least one hardware processor, based on responses to a plurality of inquiries associated with the project implementation framework, a viability score;

based on a determination that the viability score is less than a specified first viability threshold, generating, by the at least one hardware processor, an indication that the project implementation framework is not viable to be utilized by the project team;

based on a determination that the viability score is between the specified first viability threshold and a specified second viability threshold, generating, by the at least one hardware processor, an indication for further evaluation of viability of the project implementation framework to be utilized by the project team; and based on a determination that the viability score is greater than the specified second viability threshold, generating, by the at least one hardware processor, an indication that the project implementation framework is viable to be utilized by the project team.

13. The method according to claim 11, further comprising:

guiding, by the at least one hardware processor, the project team on utilization of the project implementation framework by specifying processes, activities, and timelines associated with utilization of the project implementation framework.

14. The method according to claim 11, further comprising:

documenting, by the at least one hardware processor, using at least two databases to perform a two-way sync operation, discussion by the project team in a digital format during envisioning associated with the project implementation framework; and maintaining, by the at least one hardware processor, using the at least two databases to perform the two-way sync operation, documented information for reference during execution, by the project team, of the journey associated with the project implementation framework.

15. The method according to claim 11, evaluating, by the at least one hardware processor, based on the viability for utilizing the project implementation framework and during execution of the journey associated with the project implementation framework, implementation of the social contract by the project team, determining, by the at least one hardware processor, based on the implementation of the social contract by the project team, whether the social contract is not implemented for at least one specified occurrence of the social contract requirement associated with the project implementation framework, and identifying, by the at least one hardware processor, based on the determination that the social contract is not implemented for the at least one specified occurrence of the social contract requirement associated with the project implementation framework, at least one impediment associated with the project implementation framework, further comprises:

determining, by the at least one hardware processor, whether a number of occurrences of a dishonored social contract is greater than a specified social contract threshold; and based on a determination that the number of occurrences of the dishonored social contract is greater than the specified social contract threshold, generating, by the at least one hardware processor, the at least one impediment associated with the project implementation framework.

16. The method according to claim 11, wherein remediating, by the at least one hardware processor, the identified at least one impediment associated with the project implementation framework further comprises:

identifying, by the at least one hardware processor, based on a confidence level analysis associated with the project implementation framework, similar stories;

identifying, by the at least one hardware processor, from each of the identified similar stories, at least one similar impediment to the identified at least one impediment associated with the project implementation framework and a solution to the at least one similar impediment; and remediating, by the at least one hardware processor, based on the identified solution to the at least one similar impediment, the identified at least one impediment associated with the project implementation framework.

17. A non-transitory computer readable medium having stored thereon machine readable instructions, the machine readable instructions, when executed by at least one hardware processor, cause the at least one hardware processor to:

evaluate, during execution of a journey associated with a project implementation framework, implementation of a social contract by a project team;

determine, based on the implementation of the social contract by the project team, whether the social contract is not implemented for at least one specified occurrence of a social contract requirement associated with the project implementation framework;

identify, based on a determination that the social contract is not implemented for the at least one specified occurrence of the social contract requirement associated with the project implementation framework, at least one impediment associated with the project implementation framework; and control, based on the identified at least one impediment, a system associated with the project implementation framework.

18. The non-transitory computer readable medium according to claim 17, the machine readable instructions, when executed by the at least one hardware processor, cause the at least one hardware processor to:

remediate the identified at least one impediment associated with the project implementation framework.

19. The non-transitory computer readable medium according to claim 18, the machine readable instructions to remediate the identified at least one impediment associated with the project implementation framework, when executed by the at least one hardware processor, cause the at least one hardware processor to:

identify, based on a confidence level analysis associated with the project implementation framework, similar stories;

identify, from each of the identified similar stories, at least one similar impediment to the identified at least one impediment associated with the project implementation framework and a solution to the at least one similar impediment; and remediate, based on the identified solution to the at least one similar impediment, the identified at least one impediment associated with the project implementation framework.

\* \* \* \* \*